(12) United States Patent
Tang et al.

(10) Patent No.: US 11,740,437 B2
(45) Date of Patent: Aug. 29, 2023

(54) CAMERA LENS

(71) Applicant: ZHEJIANG SUNNY OPTICS CO., LTD., Yuyao (CN)

(72) Inventors: Mengna Tang, Yuyao (CN); Xiaofeng Weng, Yuyao (CN); Jianke Wenren, Yuyao (CN); Fujian Dai, Yuyao (CN); Liefeng Zhao, Yuyao (CN)

(73) Assignee: ZHEJIANG SUNNY OPTICS CO., LTD., Yuyao (CN)

( * ) Notice: Subject to any disclaimer, the term of this patent is extended or adjusted under 35 U.S.C. 154(b) by 399 days.

(21) Appl. No.: 17/130,181

(22) Filed: Dec. 22, 2020

(65) Prior Publication Data

US 2021/0255430 A1   Aug. 19, 2021

(30) Foreign Application Priority Data

Feb. 14, 2020   (CN) .......................... 202010092975.7

(51) Int. Cl.
*G02B 13/00* (2006.01)
*G02B 9/60* (2006.01)
*G02B 27/00* (2006.01)

(52) U.S. Cl.
CPC ........... *G02B 13/0045* (2013.01); *G02B 9/60* (2013.01); *G02B 27/0025* (2013.01)

(58) Field of Classification Search
CPC ... G02B 9/60; G02B 13/0045; G02B 27/0025
See application file for complete search history.

*Primary Examiner* — Jack Dinh
(74) *Attorney, Agent, or Firm* — Birch, Stewart, Kolasch & Birch, LLP

(57) ABSTRACT

The present application discloses a camera lens, comprising, in order from an object side to an image side along an optical axis: a first lens having a positive refractive power; a second lens having a positive refractive power, an object side surface thereof being convex; a third lens having a refractive power; a fourth lens having a refractive power, an object side surface thereof being convex; and a fifth lens having a refractive power. An effective focal length f2 of the second lens and an effective focal length f1 of the first lens satisfy: $0.3 < f2/f1 < 0.7$, and a distance TTL from an object side surface of the first lens to an imaging plane of the camera lens on the optical axis and an entrance pupil diameter EPD of the camera lens satisfy: $TTL/EPD < 2.5$.

9 Claims, 13 Drawing Sheets

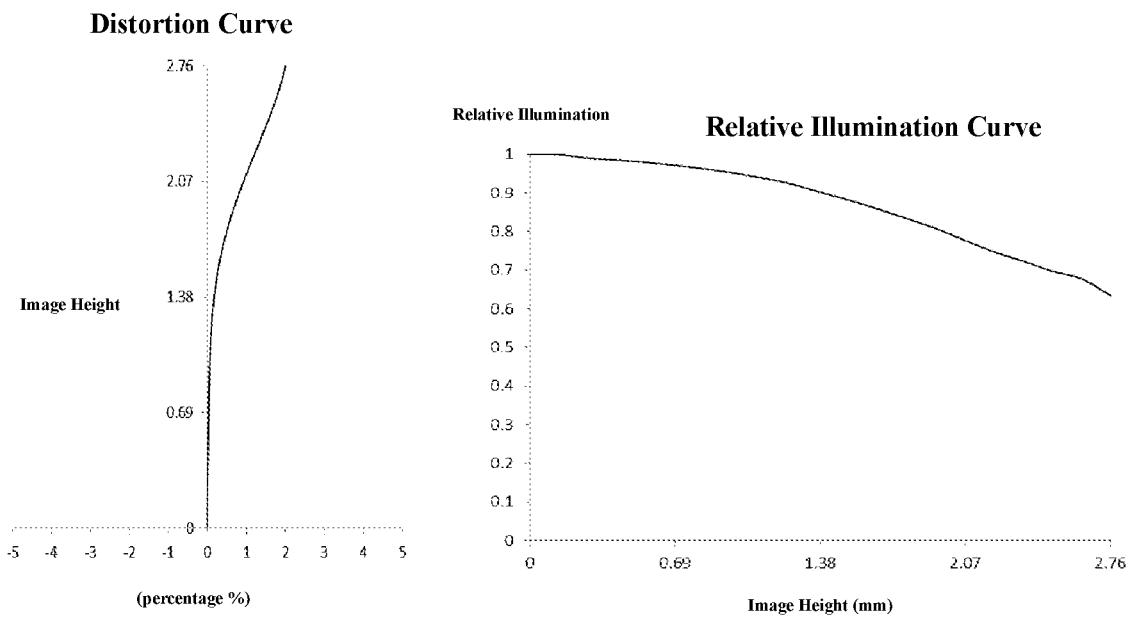
Fig. 2C
Fig. 2D
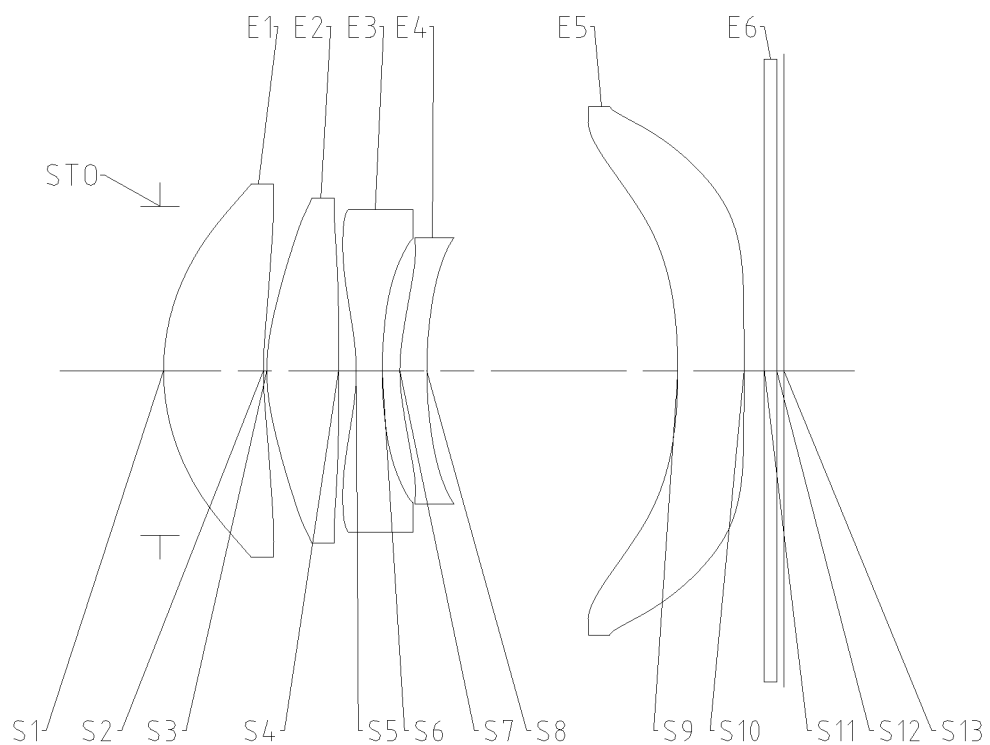
Fig. 3

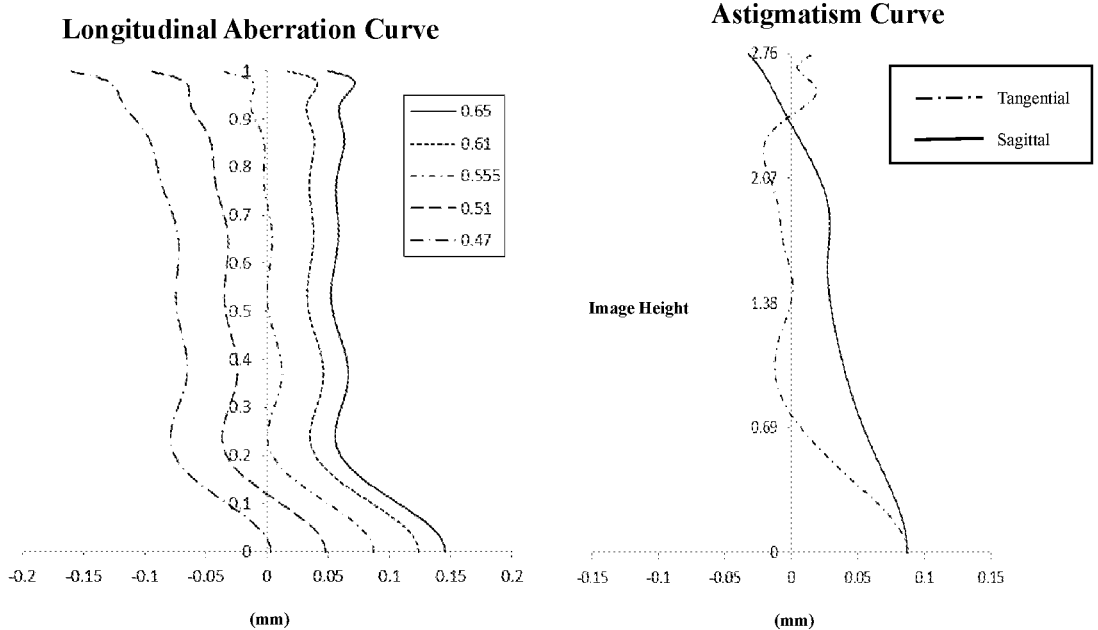
Fig. 12A
Fig. 12B
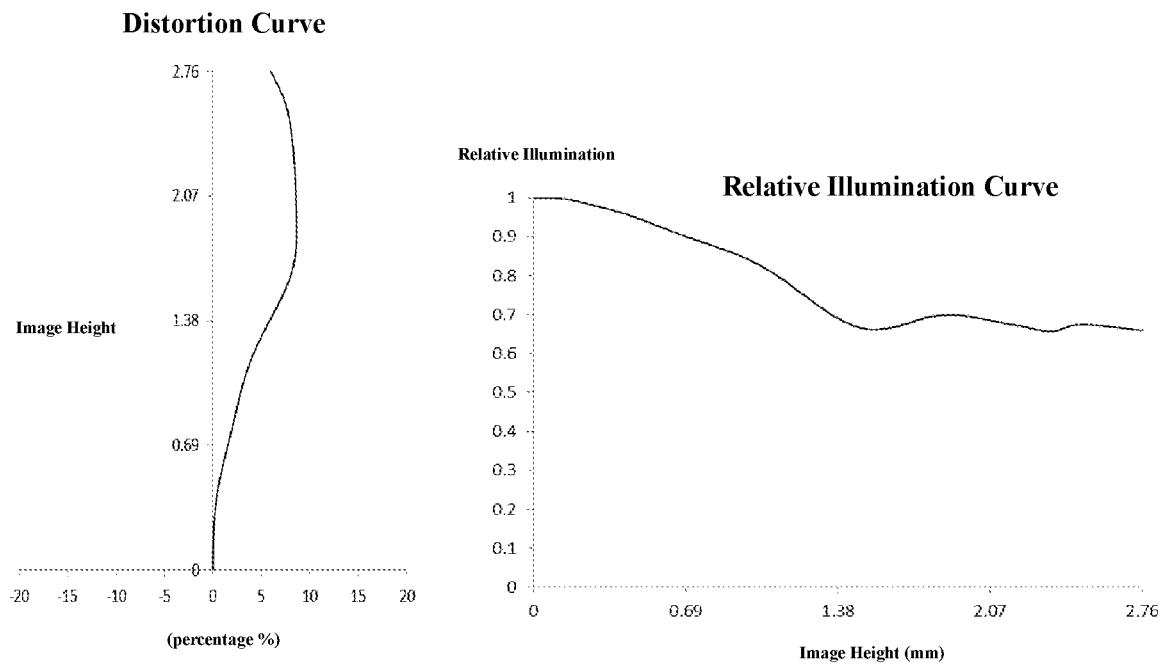
Fig. 12C
Fig. 12D

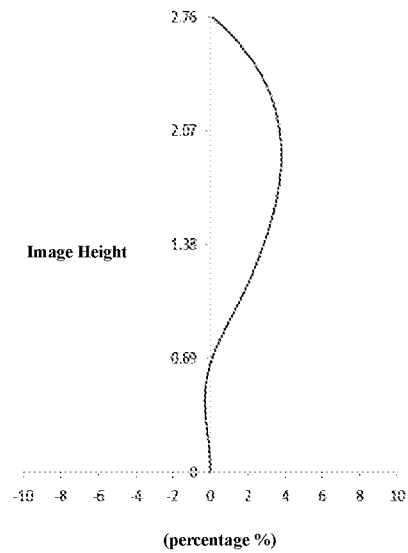
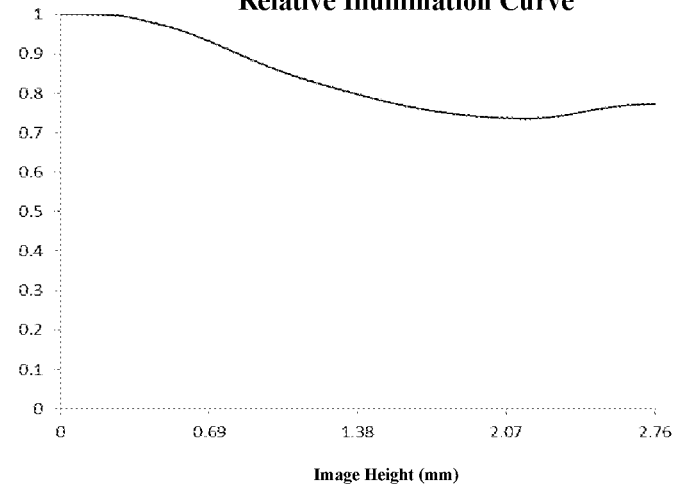
Fig. 14C
Fig. 14D
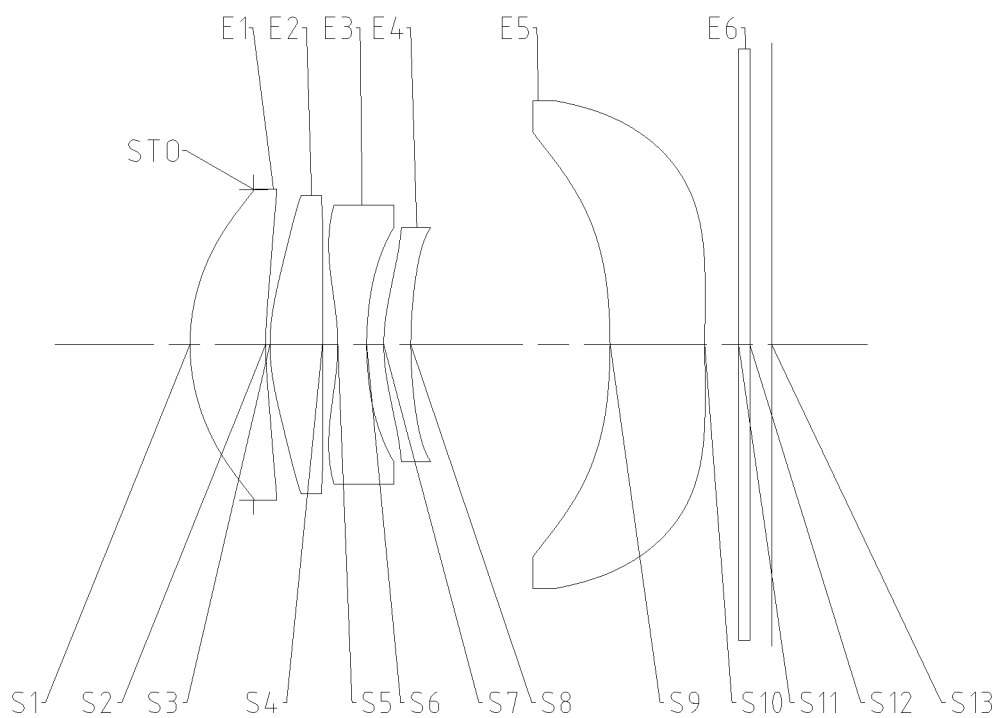
Fig. 15

CAMERA LENS

CROSS-REFERENCE TO RELATED APPLICATIONS

The present application claims the priority of Chinese patent application No. 202010092975.7, filed on Feb. 14, 2020, which is hereby incorporated by reference in its entirety.

TECHNICAL FIELD

The present application relates to the field of optical components, and specifically, to a camera lens.

TECHNICAL BACKGROUND

At present, with the continuous advancement of science and technology, the photographing level of portable electronic products such as smart phones is also continuously improving, and major manufacturers of portable electronic products such as smart phones have also taken the photographing ability as one of the main performance indicators of portable electronic products such as smart phones.

Portable electronic products such as smart phones are generally equipped with multiple different types of imaging lenses to achieve higher imaging effects. Imaging lenses capable of having higher applicability in the actual photographing process will be favored by more and more consumers, and such imaging lenses will also become standard imaging lenses for portable electronic products such as mobile phones in the future.

SUMMARY

One aspect of the present application provides a camera lens, comprising, in order from an object side to an image side along an optical axis: a first lens having a positive refractive power; a second lens having a positive refractive power, an object side surface thereof being convex; a third lens having a refractive power; a fourth lens having a refractive power, an object side surface thereof being convex; and a fifth lens having a refractive power. An effective focal length f2 of the second lens and an effective focal length f1 of the first lens may satisfy: 0.3<f2/f1<0.7, and a distance TTL from an object side surface of the first lens to an imaging plane of the camera lens on the optical axis and an entrance pupil diameter EPD of the camera lens may satisfy: TTL/EPD<2.5.

In one implementation, at least one lens surface among an object side surface of the first lens to an image side surface of the fifth lens is an aspherical lens surface.

In one implementation, a center thickness CT4 of the fourth lens and a distance TD from the object side surface of the first lens to an image side surface of the fifth lens on the optical axis may satisfy: CT4/TD<0.1.

In one implementation, a separation distance T45 between the fourth lens and the fifth lens on the optical axis and a distance TD from the object side surface of the first lens to an image side surface of the fifth lens on the optical axis may satisfy: T45/TD>0.38.

In one implementation, a radius of curvature R1 of the object side surface of the first lens and a radius of curvature R3 of the object side surface of the second lens may satisfy: 10×|(R1−R3)/(R1+R3)|<1.

In one implementation, a radius of curvature R1 of the object side surface of the first lens, a total effective focal length f of the camera lens, and an effective focal length f1 of the first lens may satisfy: 10×(R1/f−R1/f1)<1.2.

In one implementation, a combined focal length f1234 of the first lens, the second lens, the third lens, and the fourth lens, and a total effective focal length f of the camera lens may satisfy: 0.7<f1234/f<1.

In one implementation, a center thickness CT3 of the third lens and an edge thickness ET3 of the third lens may satisfy: 0.2<CT3/ET3<1.

In one implementation, a center thickness CT5 of the fifth lens and an edge thickness ET5 of the fifth lens may satisfy: 0.2<ET5/CT5<0.6.

In one implementation, a distance SAG52 from an intersection of an image side surface of the fifth lens and the optical axis to an effective radius vertex of the image side surface of the fifth lens on the optical axis, and a center thickness CT5 of the fifth lens may satisfy: −2.6<SAG52/CT5<−1.

In one implementation, an effective half diameter DT32 of an image side surface of the third lens and an effective half diameter DT41 of the object side surface of the fourth lens may satisfy: 1<DT32/DT41<1.2.

In one implementation, an effective half diameter DT41 of the object side surface of the fourth lens and a half of a diagonal length ImgH of an effective pixel region of the camera lens may satisfy: 0.3<DT41/ImgH<0.5.

In one implementation, an object side surface of the third lens has at least one inflection point, and a vertical distance YC31 from the inflection point on the object side surface of the third lens to the optical axis, and an effective half diameter DT31 of the object side surface of the third lens may satisfy: 0.5<YC31/DT31<1.

In one implementation, a separation distance T12 between the first lens and the second lens on the optical axis, a separation distance T23 between the second lens and the third lens on the optical axis, and a separation distance T34 between the third lens and the fourth lens on the optical axis may satisfy: 10×(T12+T23+T34)/TTL<1.

Another aspect of the present application provides a camera lens, comprising, in order from an object side to an image side along an optical axis: a first lens having a positive refractive power; a second lens having a positive refractive power, an object side surface thereof being convex; a third lens having a refractive power; a fourth lens having a refractive power, an object side surface thereof being convex; and a fifth lens having a refractive power. A center thickness CT4 of the fourth lens and a distance TD from an object side surface of the first lens to an image side surface of the fifth lens on the optical axis may satisfy: CT4/TD<0.1.

In the present application, multiple (e.g., five) lenses are adopted. The refractive power, surface shape and center thickness of each lens, the on-axis distances between the respective lenses, and the like are reasonably distributed, so that the above-mentioned camera lens has at least one beneficial effect of miniaturization, low sensitivity, good resolution, good machinability and formability, and high imaging quality and so on.

BRIEF DESCRIPTION OF THE DRAWINGS

Other features, objectives, and advantages of the present application will become more apparent by reading a detailed description of non-restrictive embodiments made with reference to the following drawings.

FIGS. 2A to 2D show a longitudinal aberration curve, astigmatism curve, distortion curve and relative illumination curve of the camera lens according to Embodiment 1, respectively;

FIG. 3 shows a schematic structural diagram of the camera lens according to Embodiment 2 of the present application;

FIGS. 12A to 12D show a longitudinal aberration curve, astigmatism curve, distortion curve and relative illumination curve of the camera lens according to Embodiment 6, respectively;

FIGS. 14A to 14D show a longitudinal aberration curve, astigmatism curve, distortion curve and relative illumination curve of the camera lens according to Embodiment 7, respectively;

FIG. 15 shows a schematic structural diagram of the camera lens according to Embodiment 8 of the present application;

DETAILED DESCRIPTION OF THE EMBODIMENTS

Figure 1:
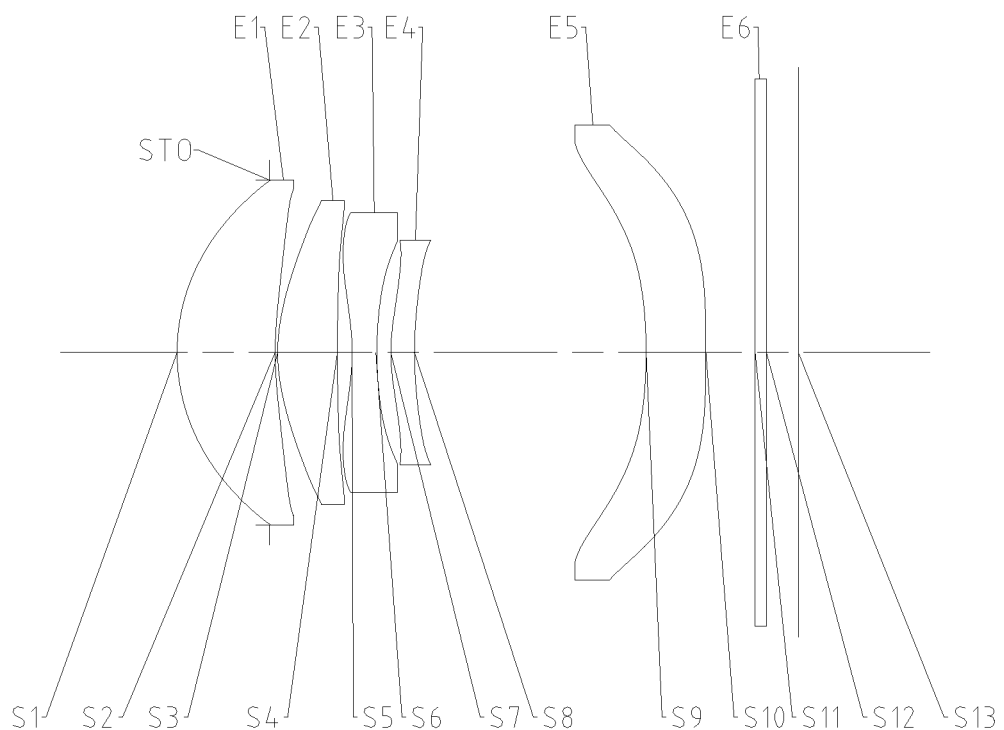
FIG. 1 shows a schematic structural diagram of the camera lens according to Embodiment 1 of the present application.

In order to better understand the present application, various aspects of the present application will be described in more detail with reference to the drawings. It should be understood that the detailed description is merely description of exemplary implementations of the present application, and does not limit the scope of the present application in any way. Throughout the description, the same reference numerals refer to the same elements. The expression "and/or" includes any and all combinations of one or more of the associated listed items.

It should be noted that in the present description, the expressions of "first", "second", "third" etc. are only used to distinguish one feature from another feature, and do not indicate any limitation on the feature. Therefore, without departing from the teachings of the present application, a first lens discussed below may also be referred to as a second lens or a third lens.

In the drawings, for convenience of explanation, the thickness, size, and shape of the lens have been slightly exaggerated. Specifically, the shapes of spherical or aspherical surfaces shown in the drawings are shown by way of example. That is, the shapes of the spherical or aspheric surfaces are not limited to those shown in the drawings. The drawings are only examples and are not drawn strictly to scale.

Herein, a paraxial region refers to a region near an optical axis. If a lens surface is convex and the position of the convex surface is not defined, then it means that the lens surface is convex at least in the paraxial region; and if the lens surface is concave and the position of the concave surface is not defined, then it means that the lens surface is concave at least in the paraxial region. A surface of each lens closest to an object to be captured is referred as an object side surface of the lens, and a surface of each lens closest to an imaging plane is referred as an image side surface of the lens.

It should also be understood that the terms "comprising", "comprise", "having", "including" and/or "include" when used in the present description, indicate the existence of stated features, elements and/or components, but does not exclude the presence or addition of one or more other features, elements, components and/or combinations thereof. Furthermore, when an expression such as "at least one of" appears before the list of listed features, it modifies the entire list of listed features, rather than the individual elements in the list. In addition, when describing the implementations of the present application, the use of "may" means "one or more implementations of the present application", and, the term "exemplary" refers to an example or illustration.

Unless otherwise defined, all terms (including technical and scientific terms) used herein have the same meanings as commonly understood by those of ordinary skill in the art to which the present application belongs. It should also be understood that the terms (such as those defined in commonly used dictionaries) should be interpreted to have meanings consistent with their meaning in the context of the relevant art and will not be interpreted in an idealized or overly formal sense unless it is clearly defined herein.

It needs to be explained that, in the case of no conflict, the embodiments in the present application and the features in the embodiments can be combined with each other. The present application will be described in detail below in conjunction with embodiments with reference to the drawings.

The features, principles and other aspects of the present application will be described in detail below.

A camera lens according to an exemplary implementation of the present application may include five lenses having refractive powers, which are a first lens, a second lens, a third lens, a fourth lens and a fifth lens, respectively. The five lenses are arranged in order from an object side to an image side along an optical axis. There may be a separation distance between any two adjacent lenses of the first to sixth lenses.

In an exemplary implementation, the first lens may have a positive refractive power; the second lens may have a positive refractive power, and an object side surface thereof may be convex; the third lens may have a positive refractive power or a negative refractive power; the fourth lens may have a positive refractive power or a negative refractive power, and an object side surface thereof may be convex; and the fifth lens may have a positive refractive power or a negative refractive power.

In an exemplary implementation, the camera lens according to the present application may satisfy: $0.3<f2/f1<0.7$, where f2 is an effective focal length of the second lens, and f1 is an effective focal length of the first lens. More specifically, f2 and f1 may further satisfy: $0.4<f2/f1<0.7$. Satisfying $0.3<f2/f1<0.7$ can not only reduce the sensitivity of the first lens and the second lens and avoid too strict tolerance requirements, but also can make the first lens and the second lens more complementary to eliminate the astigmatism, coma etc. caused by the first lens the second lens, thereby improving the imaging quality of the whole system and making the system obtain better resolution.

In an exemplary implementation, the camera lens of the present application may satisfy: TTL/EPD<2.5, where TTL is a distance TTL from an object side surface of the first lens to an imaging plane of the camera lens on the optical axis, and EPD is an entrance pupil diameter of the camera lens. More specifically, TTL and EPD may further satisfy: TTL/EPD<1.9. Satisfying TTL/EPD<2.5 can ensure the miniaturization of the optical system while ensuring that the system has sufficient luminous flux to ensure that the image plane has higher illumination, and maintains better imaging quality in a night photographing or low light energy environment.

In an exemplary implementation, the camera lens according to the present application may satisfy: CT4/TD<0.1, where CT4 is a center thickness of the fourth lens, and TD is a distance from an object side surface of the first lens to an image side surface of the fifth lens on the optical axis. More specifically, CT4 and TD may further satisfy: CT4/TD<0.09. Satisfying CT4/TD<0.1 is helpful for the miniaturization of the system, reduces the risk of ghost images caused by it, can effectively reduce the coma of the system in cooperation with the fourth lens, and at the same time, is helpful to avoid machining difficulties caused by the excessive thinness of the fourth lens.

In an exemplary implementation, the camera lens according to the present application may satisfy: T45/TD>0.38, where T45 is a separation distance between the fourth lens and the fifth lens on the optical axis, and TD is the distance from the object side surface of the first lens to the image side surface of the fifth lens on the optical axis. Satisfying T45/TD>0.38 can not only better balance the distortion of the system, but also can reduce the ghost image energy between the fourth lens and the fifth lens, which is helpful for the system to obtain better imaging quality.

In an exemplary implementation, the camera lens according to the present application may satisfy: $10\times|(R1-R3)/(R1+R3)|<1$, where R1 is a radius of curvature of the object side surface of the first lens, and R3 is a radius of curvature of the object side of the second lens. Satisfying $10\times|(R1-R3)/(R1+R3)|<1$ can not only avoid the machining difficulties caused by excessive inclination, but also can help to better converge external light and obtain a larger aperture, wherein the first lens and the second lens can effectively balance the spherical aberration of the system, reducing the sensitivity of the first lens and the second lens.

In an exemplary implementation, the camera lens according to the present application may satisfy: $10\times(R1/f-R1/f1)<1.2$, where R1 is the radius of curvature of the object side surface of the first lens, f is a total effective focal length of the camera lens, and f1 is an effective focal length of the first lens. Satisfying $10\times(R1/f-R1/f1)<1.2$ can not only effectively avoid the problem of lens sensitivity caused by the excessive concentration of the refractive power, so that the tolerance requirements are more in line with the existing process capability level, but also can effectively balance the spherical aberration, coma, astigmatism etc. produced by the first lens.

In an exemplary implementation, the camera lens according to the present application may satisfy: $0.7<f1234/f<1$, where f1234 is a combined focal length of the first lens, the second lens, the third lens, and the fourth lens, and f is a total effective focal length of the camera lens. More specifically, f1234 and f may further satisfy: $0.8<f1234/f<1$. Satisfying $0.7<f1234/f<1$ can not only better balance the aberration of the whole system and improve the imaging quality of the system, but also can control the light trend reasonably to avoid the problem of too high sensitivity of the lens sheet caused by too steep light. Moreover, it can also be helpful for the miniaturization of the system.

In an exemplary implementation, the camera lens according to the present application may satisfy: $0.2<CT3/ET3<1$, where CT3 is a center thickness of the third lens, and ET3 is an edge thickness of the third lens. Satisfying $0.2<CT3/ET3<1$ can not only be helpful for the machining and assembly process of the third lens, avoiding problems such as the difficulty of actual adjustment caused by the excessive thinness of the lens sheet and the easy deformation of the lens sheet in the assembly process, thereby affecting the quality of the imaging lens, but also is helpful for the size of the front end of the imaging lens to be not too large, which is helpful for the miniaturization of the front end of the lens group.

In an exemplary implementation, the camera lens according to the present application may satisfy: $0.2<ET5/CT5<0.6$, where CT5 is a center thickness of the fifth lens, and ET5 is an edge thickness of the fifth lens. Satisfying $0.2<ET5/CT5<0.6$ can not only better balance the distortion and field curvature of the entire system, but also can be helpful for the last lens sheet to not be easily deformed in the assembly process, which is of great help to the stability of field curvature. In addition, the molding and adjustment process has a larger space, which is helpful to avoid the risk of stray light caused by appearance problems of the fifth lens.

In an exemplary implementation, the camera lens according to the present application may satisfy: $-2.6<SAG52/CT5<-1$, where SAG52 is a distance from an intersection of an image side surface of the fifth lens and the optical axis to an effective radius vertex of the image side surface of the fifth lens on the optical axis, and CT5 is the center thickness of the fifth lens. More specifically, SAG52 and CT5 can further satisfy: $-2.6<SAG52/CT5<-1.5$. Satisfying $-2.6<SAG52/CT5<-1$ is helpful to avoid difficulties in the actual machining process, and CRA can better match a chip.

In an exemplary implementation, the camera lens according to the present application may satisfy: $1<DT32/DT41<1.2$, where DT32 is an effective half diameter of an image side surface of the third lens, and DT41 is an effective half diameter of an object side surface of the fourth lens. More specifically, DT32 and DT41 may further satisfy:

1<DT32/DT41<1.1. Satisfying 1<DT32/DT41<1.2 can not only effectively control the vignetting value of the system and intercept a part of light with poor imaging quality, so that the resolution of the whole system can be improved, but also can avoid a large step difference caused by the excessive difference in the diameters between the third lens and the fourth lens, which is helpful for the stability of assembly.

In an exemplary implementation, the camera lens according to the present application may satisfy: 0.3<DT41/ImgH<0.5, where DT41 is an effective half diameter of an object side surface of the fourth lens, and ImgH is a half of a diagonal length of an effective pixel region of the camera lens. Satisfying 0.3<DT41/ImgH<0.5 can realize the miniaturization of the optical system while making the imaging lens have a larger image plane.

Figure 17:
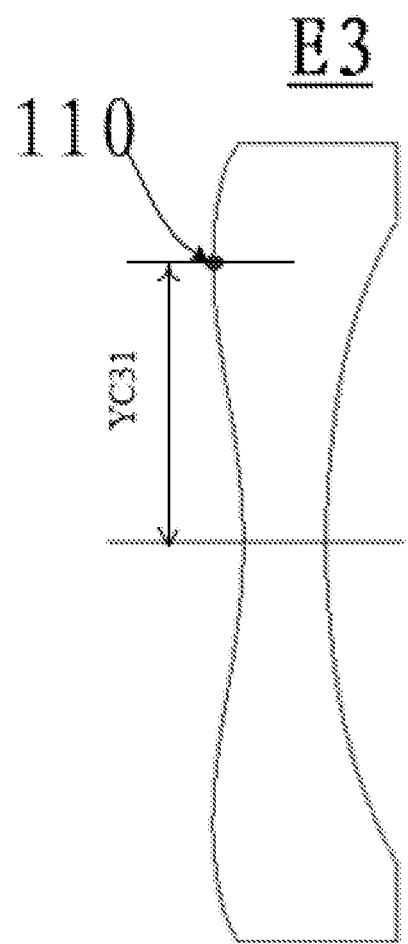
FIG. 17 schematically shows an inflection point on an object side surface of a third lens and a distance from the inflection point to an optical axis.

In an exemplary implementation, the camera lens according to the present application may satisfy: 0.5<YC31/DT31<1, where YC31 is a vertical distance from an inflection point on the object side surface of the third lens to the optical axis, and DT31 is an effective half diameter of an object side surface of the third lens. More specifically, YC31 and DT31 can further satisfy: 0.6<YC31/DT31<1. 0.5<YC31/DT31<1 is satisfied, so that the object side surface of the third lens including the inflection point can diverge external light after being converged by the first lens and the second lens, and the imaging system can obtain a larger image plane while having a larger aperture. At the same time, the cooperation between the third lens (especially the object side surface of the third lens) and the fourth lens can be used to well correct the coma problem of the system, improving the image quality. FIG. 17 schematically shows the inflection point 110 located on the object side surface of the third lens E3 and a distance YC31 from the inflection point 110 to the optical axis.

In an exemplary implementation, the camera lens according to the present application may satisfy: 10×(T12+T23+T34)/TTL<1, where T12 is a separation distance between the first lens and the second lens on the optical axis, T23 is a separation distance between the second lens and the third lens on the optical axis, and T34 is a separation distance between the third lens and the fourth lens on the optical axis. More specifically, T12, T23, T34, and TTL may further satisfy: 10×(T12+T23+T34)/TTL<0.7. Satisfying 10×(T12+T23+T34)/TTL<1 can not only be helpful for machining and assembly processability, avoiding interference problems caused by two lens sheets being too close, but also can be helpful to reduce light deflection and can adjust the field curvature of the imaging lens and reduce the sensitivity. Moreover, it can also reduce the ghost image energy among the first lens to the fourth lens.

In an exemplary implementation, the camera lens according to the present application further includes a diaphragm provided between the object side and the first lens or between the first lens and the second lens. Optionally, the camera lens described above may further include a filter for correcting color deviation and/or a protective glass for protecting a photosensitive element located on an imaging plane.

The camera lens according to the above-mentioned implementations of the present application may adopt multiple lens sheets, for example, five sheets as described above. The refractive power, surface shape and center thickness of each lens, and the on-axis distances between the respective lenses are reasonably distributed, which can effectively converge the incident light, reduce the total length of the camera lens and improve the machinability of the camera lens, so that the structure of each lens is more compact, and the camera lens is more helpful for production and machining, and has higher applicability. With the above configuration, the camera lens according to the exemplary implementations of the present application can have characteristics such as ultra-long focal length, miniaturization, and good imaging quality.

In the implementations of the present application, at least one of lens surfaces of the respective lenses is an aspheric lens surface, that is, at least one lens surface of the object side surface of the first lens to the image side surface of the fifth lens is an aspheric lens surface. An aspheric lens is characterized in that the curvature changes continuously from the center of the lens to the periphery of the lens. Unlike a spherical lens having a constant curvature from the center of the lens to the periphery of the lens, the aspheric lens has better radius-of-curvature characteristic, and has the advantages of improving distortion aberration and improving astigmatism aberration. After the aspheric lens is adopted, the aberrations that occur during imaging can be eliminated as much as possible, thereby improving the imaging quality. Optionally, at least one of an object side surface and an image side surface of each of the first lens, the second lens, the third lens, the fourth lens and the fifth lens is an aspheric lens surface. Optionally, both an object side surface and an image side surface of each of the first lens, the second lens, the third lens, the fourth lens and the fifth lens are aspheric lens surfaces.

However, it should be understood by those skilled in the art that the number of lenses constituting the camera lens can be changed without departing from the technical solution claimed in the present application, to obtain respective results and advantages described in the description. For example, although five lenses have been described in the implementations as an example, the camera lens is not limited to including the five lenses. If necessary, the camera lens may also include other numbers of lenses.

Specific embodiments of the camera lens applicable to the above-mentioned implementations will be further described below with reference to the drawings.

Embodiment 1

A camera lens according to Embodiment 1 of the present application will be described below with reference to FIGS. 1 to 2D. FIG. 1 shows a schematic structural diagram of the camera lens according to Embodiment 1 of the present application.

As shown in FIG. 1, the camera lens includes in order from an object side to an image side: a diaphragm STO, a first lens E1, a second lens E2, a third lens E3, a fourth lens E4, a fifth lens E5, a filter E6 and an imaging plane S13.

The first lens E1 has a positive refractive power, and has a convex object side surface S1 and a concave image side surface S2. The second lens E2 has a positive refractive power, and has a convex object side surface S3 and a concave image side surface S4. The third lens E3 has a negative refractive power, and has a concave object side surface S5 and a concave image side surface S6. The fourth lens E4 has a positive refractive power, and has a convex object side surface S7 and a concave image side surface S8. The fifth lens E5 has a negative refractive power, and has a concave object side surface S9 and a convex image side surface S10. The filter E6 has an object side surface S11 and an image side surface S12. Light from an object sequentially passes through the respective surfaces S1 to S12 and finally forms an image on the imaging plane S13.

Table 1 shows a table of basic parameters of the camera lens of Embodiment 1, wherein the units of the radius of curvature, thickness/distance, and focal length are all millimeters (mm).

TABLE 1

| Surface No. | Surface type | Radius of curvature | Thickness/distance | Material Refractive index | Abbe number | Focal length | Conic coefficient |
|---|---|---|---|---|---|---|---|
| OBJ | Spherical | Infinity | Infinity | | | | |
| STO | Spherical | Infinity | −0.9004 | | | | |
| S1 | Aspherical | 1.9145 | 0.9547 | 1.51 | 67.0 | 6.91 | 0.0000 |
| S2 | Aspherical | 3.4398 | 0.0250 | | | | 0.0000 |
| S3 | Aspherical | 1.7833 | 0.5812 | 1.49 | 70.0 | 3.79 | 0.0000 |
| S4 | Aspherical | 43.6648 | 0.1440 | | | | 0.0000 |
| S5 | Aspherical | −2.2034 | 0.2396 | 1.70 | 32.4 | −1.80 | 0.0000 |
| S6 | Aspherical | 3.1007 | 0.1370 | | | | 0.0000 |
| S7 | Aspherical | 1.8134 | 0.2300 | 1.76 | 22.2 | 4.23 | 0.0000 |
| S8 | Aspherical | 3.9086 | 2.2561 | | | | 0.0000 |
| S9 | Aspherical | −5.3645 | 0.5824 | 1.67 | 20.5 | −10.58 | 0.0000 |
| S10 | Aspherical | −22.7987 | 0.4792 | | | | 0.0000 |
| S11 | Spherical | Infinity | 0.1100 | 1.52 | 64.2 | | |
| S12 | Spherical | Infinity | 0.3108 | | | | |
| S13 | Spherical | Infinity | | | | | |

In this embodiment, a total effective focal length f of the camera lens is 6.65 mm, a total length TTL (i.e., a distance from the object side surface S1 of the first lens E1 to the imaging plane S13 of the camera lens on an optical axis) of the camera lens is 6.05 mm, and a half of a diagonal length ImgH of an effective pixel region on the imaging plane S13 of the camera lens is 2.76 mm.

In Embodiment 1, both the object side surface and image side surface of any one of the first lens E1 to the fifth lens E5 are aspherical, and the surface shape x of each aspherical lens can be defined by using but not limited to the following aspherical formula:

$$x = \frac{ch^2}{1+\sqrt{1-(k+1)c^2h^2}} + \sum A_i h^i \quad (1)$$

where x is a distance vector height from a vertex of the aspheric surface when the aspheric surface is at a height of h along the optical axis direction; c is paraxial curvature of the aspheric surface, c=1/R (that is, the paraxial curvature c is the reciprocal of the radius of curvature R in Table 1 above); k is a conic coefficient; and $A_i$ is a correction coefficient of an i-th order of the aspheric surface. Higher-order coefficients $A_4$, $A_6$, $A_8$, $A_{10}$, $A_{12}$, $A_{14}$, $A_{16}$, $A_{18}$, $A_{20}$, $A_{22}$ and $A_{24}$ of each of aspheric lens surfaces S1 to S10 that is applicable in Embodiment 1 are given in Tables 2-1 and 2-2 below.

TABLE 2-1

| Surface No. | A4 | A6 | A8 | A10 | A12 | A14 |
|---|---|---|---|---|---|---|
| S1 | −1.3304E−04 | −4.5179E−03 | 6.5519E−03 | −7.7811E−03 | 6.0261E−03 | −3.8513E−03 |
| S2 | −1.1563E−01 | 6.7975E−02 | −8.9514E−03 | −1.4858E−02 | 9.2650E−03 | −2.1647E−03 |
| S3 | −1.0627E−01 | 2.0776E−02 | −1.3455E−02 | 4.3697E−02 | −5.0094E−02 | 2.2674E−02 |
| S4 | 9.5861E−02 | −2.9684E−01 | 4.1313E−01 | −2.5652E−01 | 5.6947E−02 | 6.4761E−03 |
| S5 | 2.0610E−01 | −7.2236E−02 | −8.9810E−04 | 4.5436E−02 | −3.5318E−02 | 8.7575E−03 |
| S6 | −2.7507E−01 | 9.6892E−01 | −1.6638E+00 | 1.8147E+00 | −1.2765E+00 | 5.1811E−01 |
| S7 | −4.0500E−01 | 4.9508E−01 | −5.8914E−01 | 5.5981E−01 | −4.3689E−01 | 2.3959E−01 |
| S8 | −3.5573E−02 | −7.1823E−02 | 2.7608E−01 | −3.8382E−01 | 3.2333E−01 | −1.4265E−01 |
| S9 | −5.4971E−02 | 1.0001E−02 | 2.1680E−03 | −2.5455E−03 | 8.9396E−04 | −1.2487E−04 |
| S10 | −6.7172E−02 | 1.4626E−02 | −3.2200E−03 | 4.2726E−04 | −2.9128E−05 | 5.5860E−06 |

TABLE 2-2

| Surface No. | A16 | A18 | A20 | A22 | A24 |
|---|---|---|---|---|---|
| S1 | 2.1695E−03 | −9.7222E−04 | 2.8731E−04 | −4.8665E−05 | 3.7073E−06 |
| S2 | 2.0308E−04 | 0.0000E+00 | 0.0000E+00 | 0.0000E+00 | 0.0000E+00 |
| S3 | −3.7408E−03 | 1.9772E−04 | −6.4480E−05 | 0.0000E+00 | 0.0000E+00 |
| S4 | −3.2810E−03 | 0.0000E+00 | 0.0000E+00 | 0.0000E+00 | 0.0000E+00 |
| S5 | −4.8039E−06 | 0.0000E+00 | 0.0000E+00 | 0.0000E+00 | 0.0000E+00 |
| S6 | −8.1079E−02 | −6.6760E−03 | 0.0000E+00 | 0.0000E+00 | 0.0000E+00 |
| S7 | −6.4929E−02 | 7.4437E−05 | 0.0000E+00 | 0.0000E+00 | 0.0000E+00 |
| S8 | 2.3752E−02 | 5.2280E−04 | 0.0000E+00 | 0.0000E+00 | 0.0000E+00 |
| S9 | 6.0474E−06 | −1.6820E−07 | 2.7732E−08 | 0.0000E+00 | 0.0000E+00 |
| S10 | −3.2432E−06 | 8.1441E−07 | −8.8778E−08 | 5.0117E−09 | 0.0000E+00 |

Figure 2A:
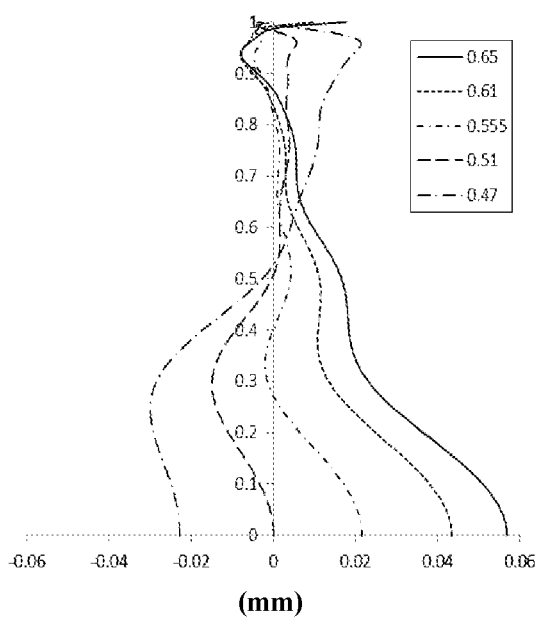
Figure 2B:
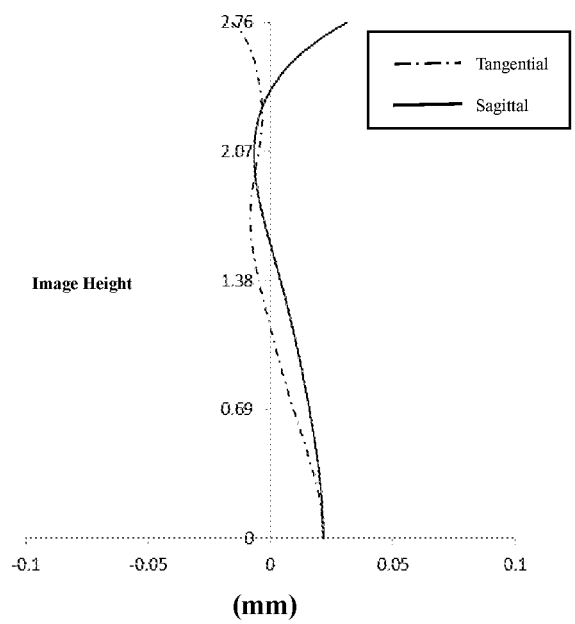

FIG. 2A shows a longitudinal aberration curve of the camera lens according to Embodiment 1, which represents the deviation of the converged focal point after light of different wavelengths passes through the imaging lens. FIG. 2B shows an astigmatism curve of the camera lens according to Embodiment 1, which represents the curvature of the tangential image plane and the curvature of the sagittal image plane. FIG. 2C shows a distortion curve of the camera lens according to Embodiment 1, which represents distortion magnitude values corresponding to different image heights. FIG. 2D shows a relative illumination curve of the camera lens according to Embodiment 1, which represents relative illumination magnitude values corresponding to different image heights. According to FIGS. 2A to 2D, it can be seen that the camera lens given in Embodiment 1 can achieve good imaging quality.

Embodiment 2

A camera lens according to Embodiment 2 of the present application will be described below with reference to FIGS. 3 to 4D. In this embodiment and the following embodiments, for the sake of brevity, the description of parts similar to those in Embodiment 1 will be omitted. FIG. 3 shows a schematic structural diagram of the camera lens according to Embodiment 2 of the present application.

As shown in FIG. 3, the camera lens includes in order from an object side to an image side: a diaphragm STO, a first lens E1, a second lens E2, a third lens E3, a fourth lens E4, a fifth lens E5, a filter E6 and an imaging plane S13.

The first lens E1 has a positive refractive power, and has a convex object side surface S1 and a concave image side surface S2. The second lens E2 has a positive refractive power, and has a convex object side surface S3 and a convex image side surface S4. The third lens E3 has a negative refractive power, and has a concave object side surface S5 and a concave image side surface S6. The fourth lens E4 has a positive refractive power, and has a convex object side surface S7 and a concave image side surface S8. The fifth lens E5 has a negative refractive power, and has a concave object side surface S9 and a convex image side surface S10. The filter E6 has an object side surface S11 and an image side surface S12. Light from an object sequentially passes through the respective surfaces S1 to S12 and finally forms an image on the imaging plane S13.

In this embodiment, a total effective focal length f of the camera lens is 5.80 mm, a total length TTL of the camera lens is 5.51 mm, and a half of a diagonal length ImgH of an effective pixel region on the imaging plane S13 of the camera lens is 2.76 mm.

Table 3 shows a table of basic parameters of the camera lens of Embodiment 2, wherein the units of the radius of curvature, thickness/distance, and focal length are all millimeters (mm). Tables 4-1 and 4-2 show higher-order coefficients of each of aspheric lens surfaces that are applicable in Embodiment 2, wherein the surface shape of each aspheric surface can be defined by formula (1) given in Embodiment 1 described above.

TABLE 3

| Surface No. | Surface type | Radius of curvature | Thickness/ distance | Material Refractive index | Abbe number | Focal length | Conic coefficient |
|---|---|---|---|---|---|---|---|
| OBJ | Spherical | Infinity | Infinity | | | | |
| STO | Spherical | Infinity | 0.0300 | | | | |
| S1 | Aspherical | 1.9811 | 0.8884 | 1.53 | 30.4 | 6.59 | 0.0000 |
| S2 | Aspherical | 3.8218 | 0.0300 | | | | 0.0000 |
| S3 | Aspherical | 1.8973 | 0.6369 | 1.52 | 30.5 | 3.43 | 0.0000 |
| S4 | Aspherical | −27.4281 | 0.1575 | | | | 0.0000 |
| S5 | Aspherical | −1.9828 | 0.2300 | 1.71 | 19.0 | −1.68 | 0.0000 |
| S6 | Aspherical | 3.1408 | 0.1574 | | | | 0.0000 |
| S7 | Aspherical | 1.6692 | 0.2393 | 1.71 | 19.0 | 4.10 | 0.0000 |
| S8 | Aspherical | 3.6630 | 2.2315 | | | | 0.0000 |
| S9 | Aspherical | −5.1330 | 0.5883 | 1.47 | 20.4 | −15.02 | 0.0000 |
| S10 | Aspherical | −18.6305 | 0.1805 | | | | 0.0000 |
| S11 | Spherical | Infinity | 0.1100 | 1.52 | 64.2 | | |
| S12 | Spherical | Infinity | 0.0636 | | | | |
| S13 | Spherical | Infinity | | | | | |

TABLE 4-1

| Surface No. | A4 | A6 | A8 | A10 | A12 | A14 |
|---|---|---|---|---|---|---|
| S1 | 1.0377E−02 | −8.6738E−02 | 3.2123E−01 | −7.2810E−01 | 1.0493E+00 | −9.9639E−01 |
| S2 | −6.1172E−02 | −1.9995E−01 | 4.9278E−01 | −5.2496E−01 | 2.9556E−01 | −5.5947E−02 |
| S3 | −3.7007E−02 | −2.9733E−01 | 6.1224E−01 | −7.0701E−01 | 5.3609E−01 | −2.3821E−01 |
| S4 | 1.2181E−01 | −2.2166E−01 | −3.8882E−01 | 1.7658E+00 | −2.6269E+00 | 2.1207E+00 |
| S5 | 2.3838E−01 | −3.5703E−02 | −6.4402E−01 | 1.9818E+00 | −3.0253E+00 | 2.7447E+00 |
| S6 | −3.5072E−01 | 1.6293E+00 | −4.8578E+00 | 1.1158E+01 | −1.8468E+01 | 2.0806E+01 |
| S7 | −4.7647E−01 | 8.3764E−01 | −1.1216E+00 | 8.3976E−02 | 3.6668E+00 | −9.1783E+00 |
| S8 | −9.0445E−02 | 6.0291E−01 | −2.9940E+00 | 1.0069E+01 | −2.1643E+01 | 2.9941E+01 |
| S9 | −1.0817E−02 | −8.9326E−02 | 1.4530E−01 | −1.3018E−01 | 7.0533E−02 | −2.3819E−02 |
| S10 | 1.2742E−01 | −3.0843E−01 | 3.3579E−01 | −2.2745E−01 | 9.7167E−02 | −2.6477E−02 |

TABLE 4-2

| Surface No. | A16 | A18 | A20 | A22 | A24 |
|---|---|---|---|---|---|
| S1 | 6.3113E−01 | −2.6373E−01 | 6.9709E−02 | −1.0549E−02 | 6.9606E−04 |
| S2 | −3.5797E−02 | 2.7033E−02 | −7.0988E−03 | 6.9011E−04 | 0.0000E+00 |
| S3 | 2.5551E−02 | 2.7691E−02 | −1.2471E−02 | 1.6105E−03 | 0.0000E+00 |
| S4 | −1.0110E+00 | 2.8129E−01 | −4.1494E−02 | 2.4239E−03 | 0.0000E+00 |
| S5 | −1.5331E+00 | 5.1458E−01 | −9.4561E−02 | 7.2578E−03 | 0.0000E+00 |
| S6 | −1.5251E+01 | 6.8660E+00 | −1.7075E+00 | 1.7928E−01 | 0.0000E+00 |
| S7 | 1.1858E+01 | −8.8066E+00 | 3.5308E+00 | −5.9009E−01 | 0.0000E+00 |
| S8 | −2.6479E+01 | 1.4433E+01 | −4.4073E+00 | 5.7575E−01 | 0.0000E+00 |
| S9 | 5.0573E−03 | −6.5726E−04 | 4.7825E−05 | −1.4939E−06 | 0.0000E+00 |
| S10 | 4.5551E−03 | −4.7031E−04 | 2.5558E−05 | −5.0563E−07 | 0.0000E+00 |

Figure 4A:
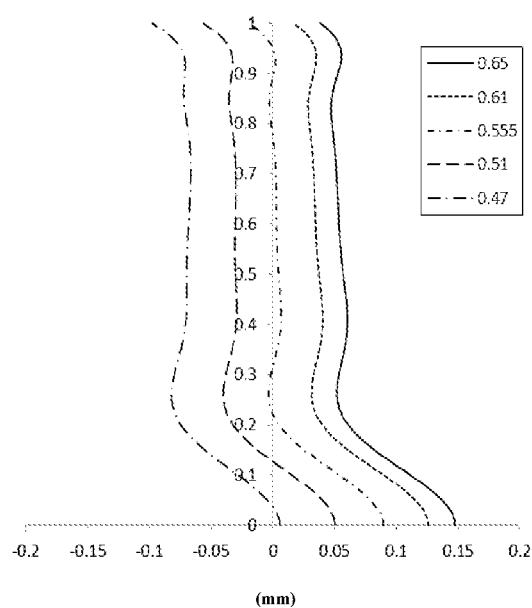
FIGS. 4A to 4D show a longitudinal aberration curve, astigmatism curve, distortion curve and relative illumination curve of the camera lens according to Embodiment 2, respectively.
Figure 4B:
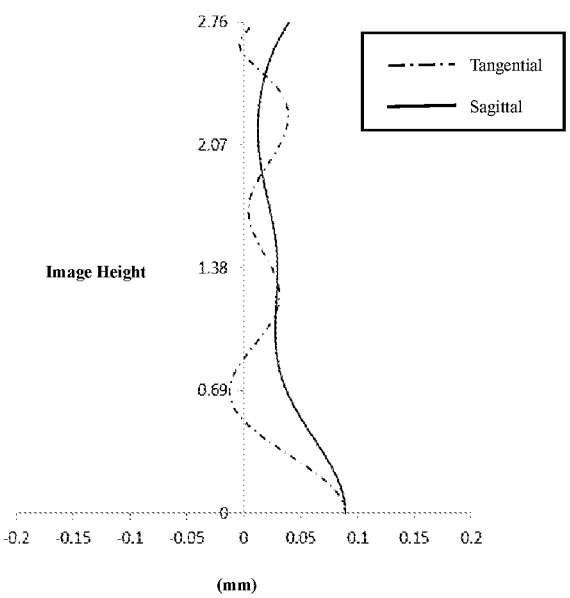
Figure 4C:
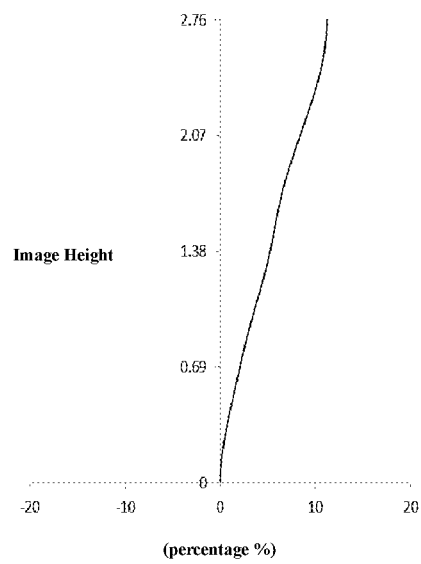
Figure 4D:
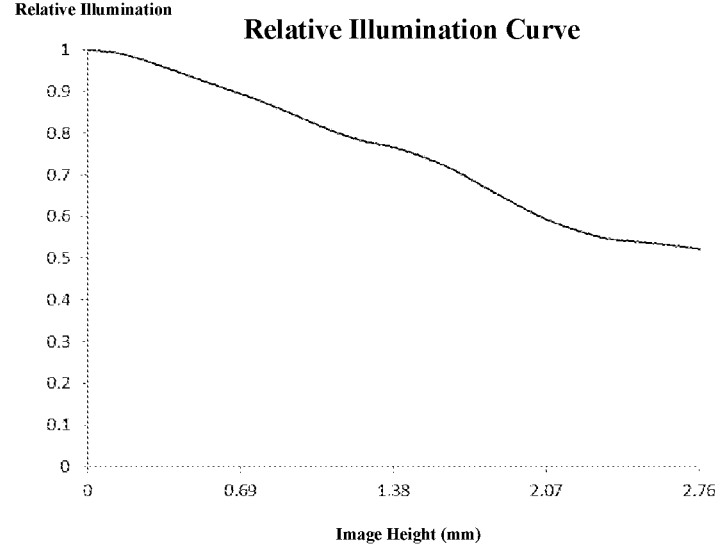

FIG. 4A shows a longitudinal aberration curve of the camera lens according to Embodiment 2, which represents the deviation of the converged focal point after light of different wavelengths passes through the imaging lens. FIG. 4B shows an astigmatism curve of the camera lens according to Embodiment 2, which represents the curvature of the tangential image plane and the curvature of the sagittal image plane. FIG. 4C shows a distortion curve of the camera lens according to Embodiment 2, which represents distortion magnitude values corresponding to different image heights. FIG. 4D shows a relative illumination curve of the camera lens according to Embodiment 2, which represents relative illumination magnitude values corresponding to different image heights. According to FIGS. 4A to 4D, it can be seen that the camera lens given in Embodiment 2 can achieve good imaging quality.

Embodiment 3

Figure 5:
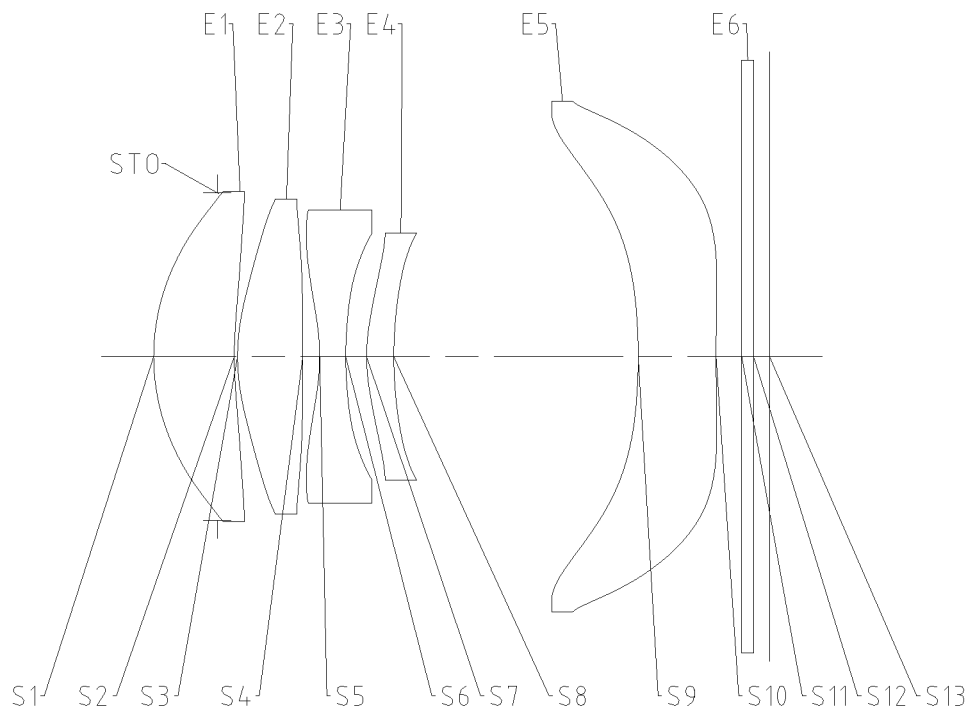
FIG. 5 shows a schematic structural diagram of the camera lens according to Embodiment 3 of the present application.

A camera lens according to Embodiment 3 of the present application will be described below with reference to FIGS. 5 to 6D. FIG. 5 shows a schematic structural diagram of the camera lens according to Embodiment 3 of the present application.

As shown in FIG. 5, the camera lens includes in order from an object side to an image side: a diaphragm STO, a first lens E1, a second lens E2, a third lens E3, a fourth lens E4, a fifth lens E5, a filter E6 and an imaging plane S13.

The first lens E1 has a positive refractive power, and has a convex object side surface S1 and a concave image side surface S2. The second lens E2 has a positive refractive power, and has a convex object side surface S3 and a convex image side surface S4. The third lens E3 has a negative refractive power, and has a concave object side surface S5 and a concave image side surface S6. The fourth lens E4 has a positive refractive power, and has a convex object side surface S7 and a concave image side surface S8. The fifth lens E5 has a negative refractive power, and has a convex object side surface S9 and a concave image side surface S10. The filter E6 has an object side surface S11 and an image side surface S12. Light from an object sequentially passes through the respective surfaces S1 to S12 and finally forms an image on the imaging plane S13.

In this embodiment, a total effective focal length f of the camera lens is 6.03 mm, a total length TTL of the camera lens is 5.73 mm, and a half of a diagonal length ImgH of an effective pixel region on the imaging plane S13 of the camera lens is 2.76 mm.

Table 5 shows a table of basic parameters of the camera lens of Embodiment 3, wherein the units of the radius of curvature, thickness/distance, and focal length are all millimeters (mm). Tables 6-1 and 6-2 show higher-order coefficients of each of aspheric lens surfaces that are applicable in Embodiment 3, wherein the surface shape of each aspheric surface can be defined by formula (1) given in Embodiment 1 described above.

TABLE 5

| Surface No. | Surface type | Radius of curvature | Thickness/ distance | Material Refractive index | Material Abbe number | Focal length | Conic coefficient |
|---|---|---|---|---|---|---|---|
| OBJ | Spherical | Infinity | Infinity | | | | |
| STO | Spherical | Infinity | −0.5914 | | | | |
| S1 | Aspherical | 1.9984 | 0.7499 | 1.52 | 30.4 | 6.92 | 0.0000 |
| S2 | Aspherical | 3.8484 | 0.0300 | | | | 0.0000 |
| S3 | Aspherical | 1.9178 | 0.6072 | 1.52 | 30.4 | 3.38 | 0.0000 |
| S4 | Aspherical | −22.2629 | 0.1568 | | | | 0.0000 |
| S5 | Aspherical | −1.9621 | 0.2422 | 1.70 | 19.0 | −1.68 | 0.0000 |
| S6 | Aspherical | 3.1733 | 0.1943 | | | | 0.0000 |
| S7 | Aspherical | 1.6376 | 0.2527 | 1.71 | 19.0 | 3.98 | 0.0000 |
| S8 | Aspherical | 3.6304 | 2.2740 | | | | 0.0000 |
| S9 | Aspherical | −5.3150 | 0.7240 | 1.51 | 20.1 | −9.50 | 0.0000 |
| S10 | Aspherical | 66.9717 | 0.2392 | | | | 0.0000 |
| S11 | Spherical | Infinity | 0.1100 | 1.52 | 64.2 | | |
| S12 | Spherical | Infinity | 0.1485 | | | | |
| S13 | Spherical | Infinity | | | | | |

TABLE 6-1

| Surface No. | A4 | A6 | A8 | A10 | A12 | A14 |
|---|---|---|---|---|---|---|
| S1 | 7.5269E−03 | −7.6443E−02 | 3.2107E−01 | −8.0474E−01 | 1.2612E+00 | −1.2916E+00 |
| S2 | −7.2516E−02 | −1.2076E−01 | 2.7757E−01 | −2.0454E−01 | 1.5672E−03 | 1.1600E−01 |
| S3 | −4.9853E−02 | −2.0812E−01 | 3.9962E−01 | −5.0290E−01 | 5.5366E−01 | −4.8839E−01 |
| S4 | 9.2202E−02 | −1.1184E−01 | −5.8912E−01 | 2.1168E+00 | −3.3141E+00 | 3.0588E+00 |
| S5 | 1.9360E−01 | 2.0005E−01 | −1.2559E+00 | 3.0945E+00 | −4.6044E+00 | 4.4090E+00 |
| S6 | −3.2071E−01 | 1.6641E+00 | −5.5415E+00 | 1.4368E+01 | −2.7119E+01 | 3.5401E+01 |
| S7 | −4.3450E−01 | 9.7136E−01 | −2.7748E+00 | 6.8925E+00 | −1.2645E+01 | 1.5935E+01 |
| S8 | −6.4632E−02 | 3.2713E−01 | −1.4986E+00 | 4.8672E+00 | −1.0135E+01 | 1.3683E+01 |
| S9 | 1.7195E−02 | −1.3219E−01 | 1.8415E−01 | −1.5117E−01 | 7.8339E−02 | −2.6162E−02 |
| S10 | 1.0326E−01 | −2.9625E−01 | 3.2829E−01 | −2.2091E−01 | 9.3420E−02 | −2.5269E−02 |

TABLE 6-2

| Surface No. | A16 | A18 | A20 | A22 | A24 |
|---|---|---|---|---|---|
| S1 | 8.7898E−01 | −3.9414E−01 | 1.1184E−01 | −1.8195E−02 | 1.2930E−03 |
| S2 | −9.9048E−02 | 4.0936E−02 | −8.7297E−03 | 7.6656E−04 | 0.0000E+00 |
| S3 | 2.9500E−01 | −1.1065E−01 | 2.3212E−02 | −2.0925E−03 | 0.0000E+00 |
| S4 | −1.7636E+00 | 6.2401E−01 | −1.2389E−01 | 1.0562E−02 | 0.0000E+00 |
| S5 | −2.7230E+00 | 1.0455E+00 | −2.2663E−01 | 2.1185E−02 | 0.0000E+00 |
| S6 | −3.0848E+01 | 1.7079E+01 | −5.4317E+00 | 7.5653E−01 | 0.0000E+00 |
| S7 | −1.3280E+01 | 6.9559E+00 | −2.0686E+00 | 2.6623E−01 | 0.0000E+00 |
| S8 | −1.1898E+01 | 6.4130E+00 | −1.9422E+00 | 2.5163E−01 | 0.0000E+00 |
| S9 | 5.6181E−03 | −7.4903E−04 | 5.6409E−05 | −1.8338E−06 | 0.0000E+00 |
| S10 | 4.3332E−03 | −4.4868E−04 | 2.4765E−05 | −5.1710E−07 | 0.0000E+00 |

Figure 6A:
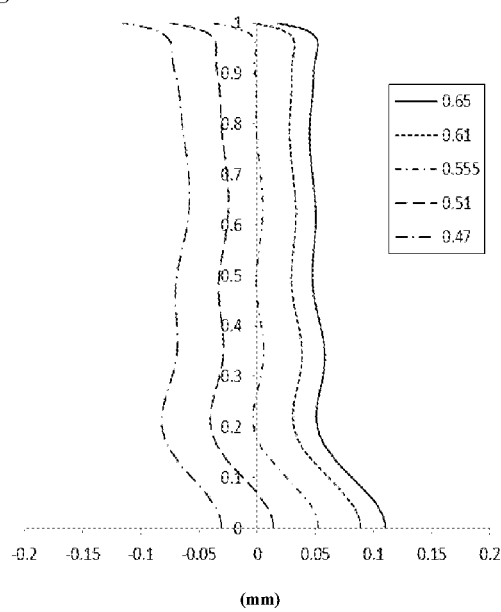
FIGS. 6A to 6D show a longitudinal aberration curve, astigmatism curve, distortion curve and relative illumination curve of the camera lens according to Embodiment 3, respectively.
Figure 6B:
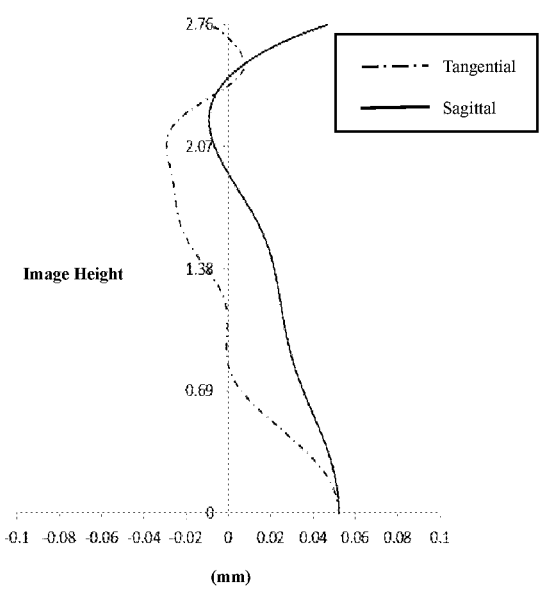
Figure 6C:
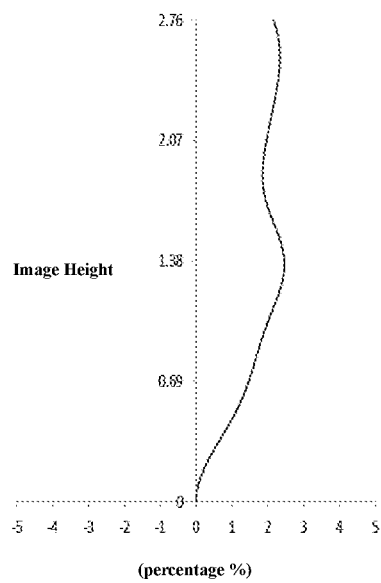
Figure 6D:
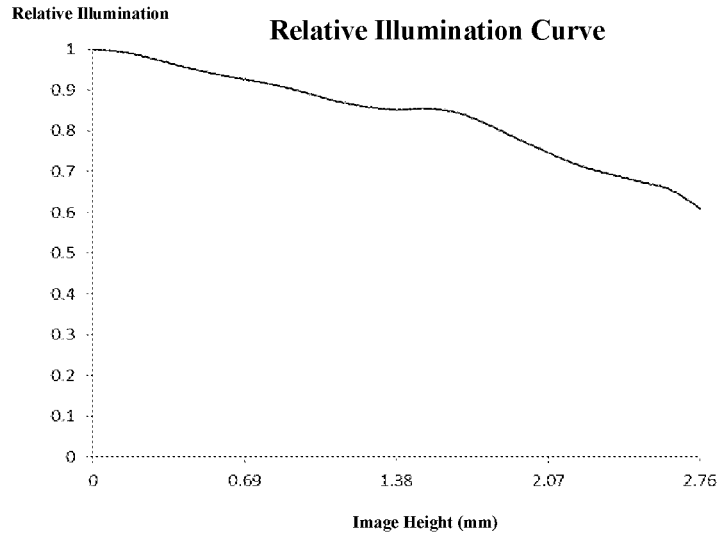

FIG. 6A shows a longitudinal aberration curve of the camera lens according to Embodiment 3, which represents the deviation of the converged focal point after light of different wavelengths passes through the imaging lens. FIG. 6B shows an astigmatism curve of the camera lens according to Embodiment 3, which represents the curvature of the tangential image plane and the curvature of the sagittal image plane. FIG. 6C shows a distortion curve of the camera lens according to Embodiment 3, which represents distortion magnitude values corresponding to different image heights. FIG. 6D shows a relative illumination curve of the camera lens according to Embodiment 3, which represents relative illumination magnitude values corresponding to different image heights. According to FIGS. 6A to 6D, it can be seen that the camera lens given in Embodiment 3 can achieve good imaging quality.

Embodiment 4

Figure 7:
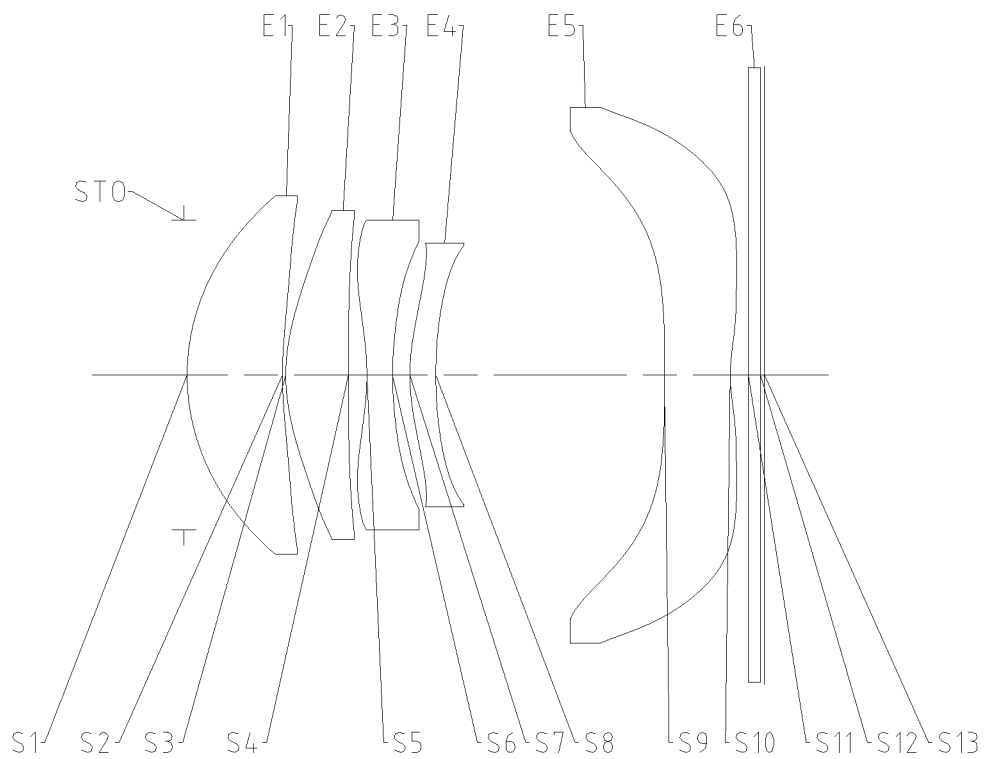
FIG. 7 shows a schematic structural diagram of the camera lens according to Embodiment 4 of the present application.

A camera lens according to Embodiment 4 of the present application will be described below with reference to FIGS. 7 to 8D. FIG. 7 shows a schematic structural diagram of the camera lens according to Embodiment 4 of the present application.

As shown in FIG. 7, the camera lens includes in order from an object side to an image side: a diaphragm STO, a first lens E1, a second lens E2, a third lens E3, a fourth lens E4, a fifth lens E5, a filter E6 and an imaging plane S13.

The first lens E1 has a positive refractive power, and has a convex object side surface S1 and a concave image side surface S2. The second lens E2 has a positive refractive power, and has a convex object side surface S3 and a convex image side surface S4. The third lens E3 has a negative refractive power, and has a concave object side surface S5 and a concave image side surface S6. The fourth lens E4 has a positive refractive power, and has a convex object side surface S7 and a concave image side surface S8. The fifth lens E5 has a negative refractive power, and has a convex object side surface S9 and a concave image side surface S10. The filter E6 has an object side surface S11 and an image side surface S12. Light from an object sequentially passes through the respective surfaces S1 to S12 and finally forms an image on the imaging plane S13.

In this embodiment, a total effective focal length f of the camera lens is 5.49 mm, a total length TTL of the camera lens is 5.20 mm, and a half of a diagonal length ImgH of an effective pixel region on the imaging plane S13 of the camera lens is 2.76 mm.

Table 7 shows a table of basic parameters of the camera lens of Embodiment 4, wherein the units of the radius of curvature, thickness/distance, and focal length are all millimeters (mm). Tables 8-1 and 8-2 show higher-order coefficients of each of aspheric lens surfaces that are applicable in Embodiment 4, wherein the surface shape of each aspheric surface can be defined by formula (1) given in Embodiment 1 described above.

TABLE 7

| | | | | Material | | | |
|---|---|---|---|---|---|---|---|
| Surface No. | Surface type | Radius of curvature | Thickness/ distance | Refractive index | Abbe number | Focal length | Conic coefficient |
| OBJ | Spherical | Infinity | Infinity | | | | |
| STO | Spherical | Infinity | 0.0299 | | | | |
| S1 | Aspherical | 1.9521 | 0.8592 | 1.51 | 49.8 | 7.03 | 0.0000 |

TABLE 7-continued

| Surface No. | Surface type | Radius of curvature | Thickness/ distance | Material Refractive index | Abbe number | Focal length | Conic coefficient |
|---|---|---|---|---|---|---|---|
| S2 | Aspherical | 3.6207 | 0.0301 | | | | 0.0000 |
| S3 | Aspherical | 1.7644 | 0.5642 | 1.50 | 30.6 | 3.36 | 0.0000 |
| S4 | Aspherical | −38.3856 | 0.1669 | | | | 0.0000 |
| S5 | Aspherical | −2.4072 | 0.2301 | 1.69 | 19.7 | −1.83 | 0.0000 |
| S6 | Aspherical | 2.8218 | 0.1572 | | | | 0.0000 |
| S7 | Aspherical | 1.8459 | 0.2334 | 1.75 | 17.2 | 4.09 | 0.0000 |
| S8 | Aspherical | 4.3034 | 2.0593 | | | | 0.0000 |
| S9 | Aspherical | 15.3244 | 0.5938 | 1.64 | 22.8 | −2.17 | 0.0000 |
| S10 | Aspherical | 1.2728 | 0.1634 | | | | −1.0000 |
| S11 | Spherical | Infinity | 0.1100 | 1.52 | 64.2 | | |
| S12 | Spherical | Infinity | 0.0370 | | | | |
| S13 | Spherical | Infinity | | | | | |

TABLE 8-1

| Surface No. | A4 | A6 | A8 | A10 | A12 | A14 |
|---|---|---|---|---|---|---|
| S1 | 4.8401E−03 | −5.5120E−02 | 2.2627E−01 | −5.5186E−01 | 8.2662E−01 | −7.9172E−01 |
| S2 | −8.1985E−02 | −1.8258E−01 | 7.3934E−01 | −1.4792E+00 | 2.0663E+00 | −2.0753E+00 |
| S3 | −5.4827E−02 | −2.8838E−01 | 1.0112E+00 | −2.3423E+00 | 3.8949E+00 | −4.5086E+00 |
| S4 | 1.3946E−01 | −2.7477E−01 | 3.9154E−02 | 7.8940E−01 | −1.4736E+00 | 1.3102E+00 |
| S5 | 1.6561E−01 | −1.3805E−02 | −4.0008E−01 | 1.6369E+00 | −3.3850E+00 | 4.3220E+00 |
| S6 | −2.8575E−01 | 9.6977E−01 | −2.6562E+00 | 6.5940E+00 | −1.2820E+01 | 1.7819E+01 |
| S7 | −2.5539E−01 | 1.8802E−01 | 6.9225E−01 | −4.7979E+00 | 1.4424E+01 | −2.6847E+01 |
| S8 | 4.6722E−02 | 1.3936E−02 | −2.8232E−01 | 1.0947E+00 | −2.4642E+00 | 3.4497E+00 |
| S9 | −3.1507E−01 | 6.6775E−01 | −9.7931E−01 | 9.1433E−01 | −5.6606E−01 | 2.3717E−01 |
| S10 | −1.2312E+00 | 2.1886E+00 | −2.3753E+00 | 1.6584E+00 | −7.7413E−01 | 2.4586E−01 |

TABLE 8-2

| Surface No. | A16 | A18 | A20 | A22 | A24 |
|---|---|---|---|---|---|
| S1 | 4.9275E−01 | −1.9776E−01 | 4.9209E−02 | −6.8862E−03 | 4.1325E−04 |
| S2 | 1.4556E+00 | −6.8322E−01 | 2.0251E−01 | −3.4083E−02 | 2.4755E−03 |
| S3 | 3.5156E+00 | −1.7933E+00 | 5.7143E−01 | −1.0300E−01 | 8.0061E−03 |
| S4 | −6.6448E−01 | 1.9419E−01 | −2.9428E−02 | 1.4177E−03 | 8.2902E−05 |
| S5 | −3.6131E+00 | 1.9857E+00 | −6.9161E−01 | 1.3844E−01 | −1.2123E−02 |
| S6 | −1.7180E+01 | 1.1267E+01 | −4.8214E+00 | 1.2178E+00 | −1.3774E−01 |
| S7 | 3.2661E+01 | −2.5919E+01 | 1.2942E+01 | −3.7002E+00 | 4.6321E−01 |
| S8 | −2.9458E+00 | 1.4087E+00 | −2.3051E−01 | −8.8156E−02 | 3.4617E−02 |
| S9 | −6.7417E−02 | 1.2785E−02 | −1.5460E−03 | 1.0766E−04 | −3.2818E−06 |
| S10 | −5.3194E−02 | 7.7001E−03 | −7.1102E−04 | 3.7658E−05 | −8.6298E−07 |

Figure 8A:
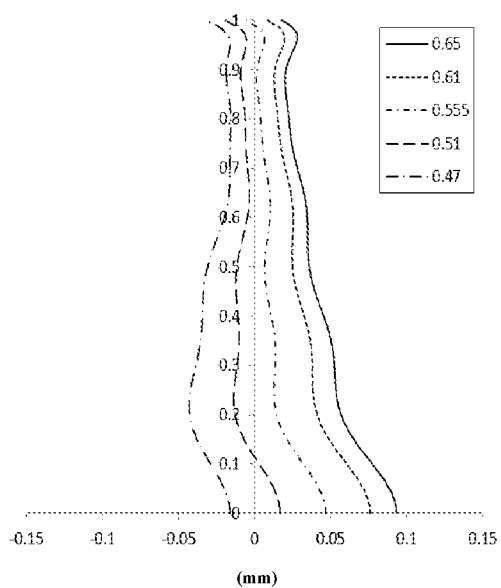
FIGS. 8A to 8D show a longitudinal aberration curve, astigmatism curve, distortion curve and relative illumination curve of the camera lens according to Embodiment 4, respectively.
Figure 8B:
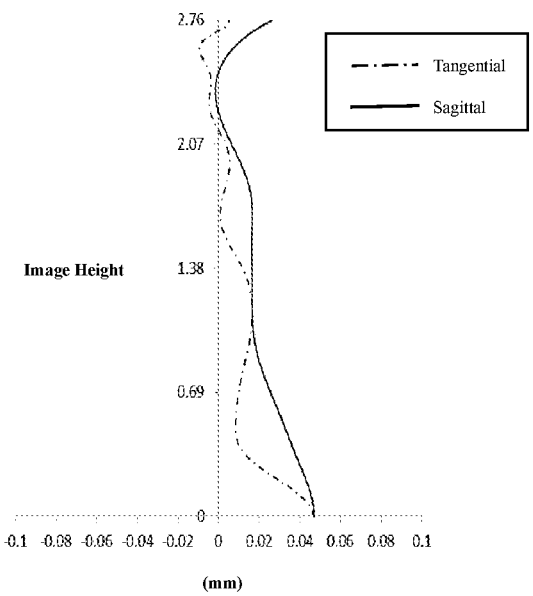
Figure 8C:
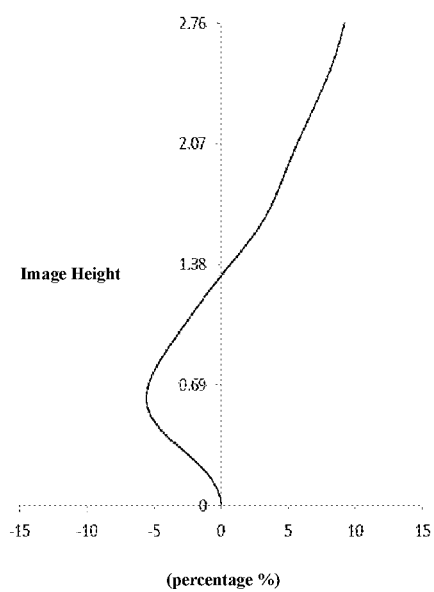
Figure 8D:
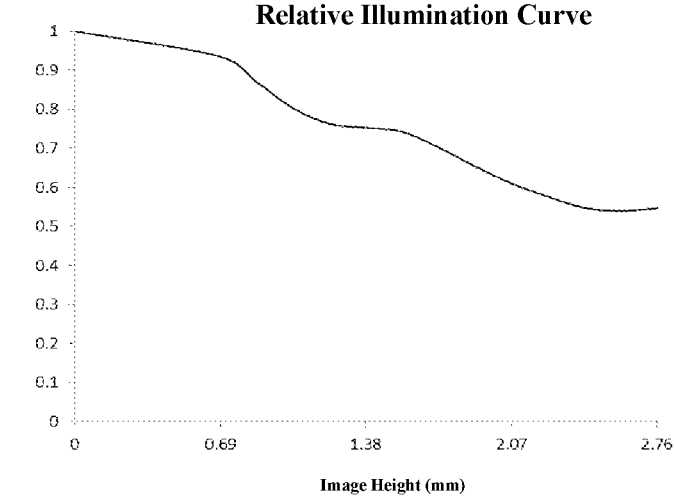

FIG. 8A shows a longitudinal aberration curve of the camera lens according to Embodiment 4, which represents the deviation of the converged focal point after light of different wavelengths passes through the imaging lens. FIG. 8B shows an astigmatism curve of the camera lens according to Embodiment 4, which represents the curvature of the tangential image plane and the curvature of the sagittal image plane. FIG. 8C shows a distortion curve of the camera lens according to Embodiment 4, which represents distortion magnitude values corresponding to different image heights. FIG. 8D shows a relative illumination curve of the camera lens according to Embodiment 4, which represents relative illumination magnitude values corresponding to different image heights. According to FIGS. 8A to 8D, it can be seen that the camera lens given in Embodiment 4 can achieve good imaging quality.

Embodiment 5

Figure 9:
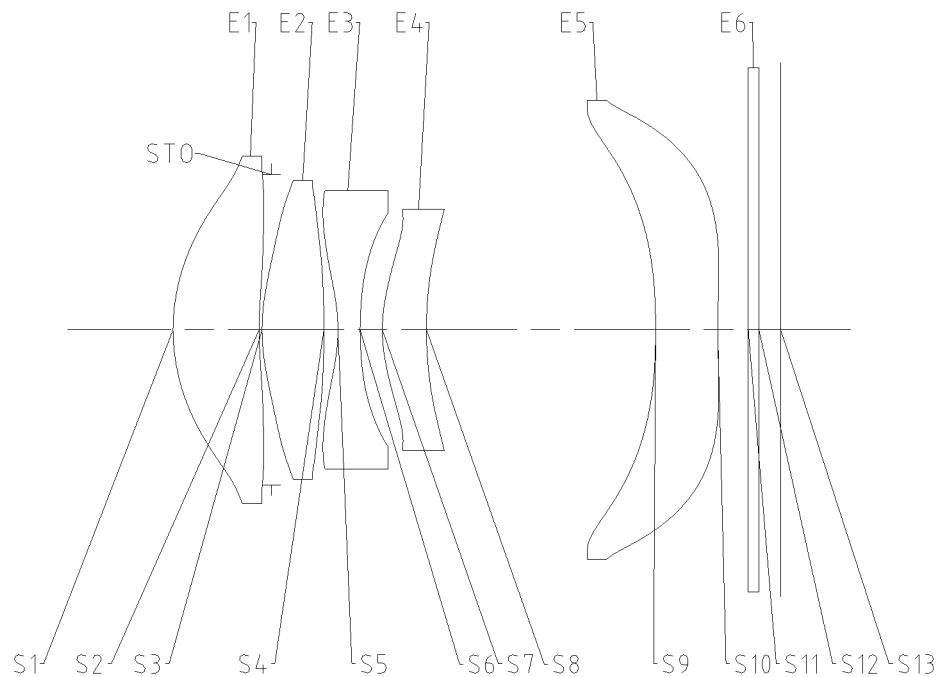
FIG. 9 shows a schematic structural diagram of the camera lens according to Embodiment 5 of the present application.

A camera lens according to Embodiment 5 of the present application will be described below with reference to FIGS. 9 to 10D. FIG. 9 shows a schematic structural diagram of the camera lens according to Embodiment 5 of the present application.

As shown in FIG. 9, the camera lens includes in order from an object side to an image side: a first lens E1, a diaphragm STO, a second lens E2, a third lens E3, a fourth lens E4, a fifth lens E5, a filter E6 and an imaging plane S13.

The first lens E1 has a positive refractive power, and has a convex object side surface S1 and a concave image side surface S2. The second lens E2 has a positive refractive power, and has a convex object side surface S3 and a convex image side surface S4. The third lens E3 has a negative refractive power, and has a concave object side surface S5 and a concave image side surface S6. The fourth lens E4 has a positive refractive power, and has a convex object side surface S7 and a concave image side surface S8. The fifth lens E5 has a negative refractive power, and has a concave object side surface S9 and a concave image side surface S10. The filter E6 has an object side surface S11 and an image side surface S12. Light from an object sequentially passes through the respective surfaces S1 to S12 and finally forms an image on the imaging plane S13.

In this embodiment, a total effective focal length f of the camera lens is 6.66 mm, a total length TTL of the camera lens is 6.32 mm, and a half of a diagonal length ImgH of an effective pixel region on the imaging plane S13 of the camera lens is 2.76 mm.

Table 9 shows a table of basic parameters of the camera lens of Embodiment 5, wherein the units of the radius of curvature, thickness/distance, and focal length are all millimeters (mm). Tables 10-1 and 10-2 show higher-order coefficients of each of aspheric lens surfaces that are applicable in Embodiment 5, wherein the surface shape of each aspheric surface can be defined by formula (1) given in Embodiment 1 described above.

TABLE 9

| Surface No. | Surface type | Radius of curvature | Thickness/ distance | Refractive index | Abbe number | Focal length | Conic coefficient |
|---|---|---|---|---|---|---|---|
| OBJ | Spherical | Infinity | Infinity | | | | |
| S1 | Aspherical | 2.1069 | 0.8956 | 1.49 | 30.8 | 7.46 | 0.0000 |
| S2 | Aspherical | 4.2946 | 0.1300 | | | | 0.0000 |
| STO | Spherical | Infinity | −0.1000 | | | | |
| S3 | Aspherical | 2.1072 | 0.6438 | 1.52 | 30.5 | 3.44 | 0.0000 |
| S4 | Aspherical | −10.8477 | 0.1463 | | | | 0.0000 |
| S5 | Aspherical | −1.8228 | 0.2300 | 1.71 | 19.0 | −1.60 | 0.0000 |
| S6 | Aspherical | 3.2087 | 0.2315 | | | | 0.0000 |
| S7 | Aspherical | 1.6153 | 0.4592 | 1.69 | 19.3 | 3.45 | 0.0000 |
| S8 | Aspherical | 4.3864 | 2.3845 | | | | 0.0000 |
| S9 | Aspherical | −7.3327 | 0.6462 | 1.49 | 20.3 | −7.59 | 0.0000 |
| S10 | Aspherical | 7.9672 | 0.3176 | | | | 0.0000 |
| S11 | Spherical | Infinity | 0.1100 | 1.52 | 64.2 | | |
| S12 | Spherical | Infinity | 0.2270 | | | | |
| S13 | Spherical | Infinity | | | | | |

TABLE 10-1

| Surface No. | A4 | A6 | A8 | A10 | A12 | A14 |
|---|---|---|---|---|---|---|
| S1 | 4.8428E−03 | −4.3590E−02 | 1.3977E−01 | −2.6887E−01 | 3.2029E−01 | −2.4930E−01 |
| S2 | −1.0707E−01 | 1.5102E−02 | 4.5493E−02 | −3.7573E−02 | 9.3021E−03 | 5.4506E−03 |
| S3 | −9.0234E−02 | −6.7502E−02 | 1.5347E−01 | −2.1952E−01 | 2.5932E−01 | −2.0317E−01 |
| S4 | 3.8082E−02 | −1.8741E−01 | 2.2337E−01 | −1.7913E−02 | −1.9531E−01 | 2.1705E−01 |
| S5 | 1.4783E−01 | 3.1278E−01 | −1.1031E+00 | 1.9983E+00 | −2.3448E+00 | 1.8415E+00 |
| S6 | −2.4230E−01 | 1.2556E+00 | −3.4490E+00 | 7.0892E+00 | −1.1008E+01 | 1.2241E+01 |
| S7 | −2.7793E−01 | 3.4598E−01 | −2.9485E−01 | −2.7413E−01 | 1.2668E+00 | −2.0147E+00 |
| S8 | 9.8124E−03 | 5.0594E−02 | −3.0487E−01 | 9.4047E−01 | −1.7041E+00 | 1.8735E+00 |
| S9 | −2.7829E−02 | −4.7327E−02 | 9.4801E−02 | −8.3526E−02 | 4.2935E−02 | −1.3780E−02 |
| S10 | −9.1243E−02 | 1.9358E−02 | 9.7192E−03 | −1.3154E−02 | 6.3975E−03 | −1.8247E−03 |

TABLE 10-2

| Surface No. | A16 | A18 | A20 | A22 | A24 |
|---|---|---|---|---|---|
| S1 | 1.2874E−01 | −4.3679E−02 | 9.3310E−03 | −1.1354E−03 | 5.9943E−05 |
| S2 | −6.1029E−03 | 2.5369E−03 | −5.1350E−04 | 4.1719E−05 | 0.0000E+00 |
| S3 | 9.7785E−02 | −2.7906E−02 | 4.3344E−03 | −2.8172E−04 | 0.0000E+00 |
| S4 | −1.1933E−01 | 3.7842E−02 | −6.6600E−03 | 5.0900E−04 | 0.0000E+00 |
| S5 | −9.5831E−01 | 3.1710E−01 | −6.0428E−02 | 5.0518E−03 | 0.0000E+00 |
| S6 | −9.2609E+00 | 4.4959E+00 | −1.2600E+00 | 1.5491E−01 | 0.0000E+00 |
| S7 | 1.8225E+00 | −9.7521E−01 | 2.8742E−01 | −3.6053E−02 | 0.0000E+00 |
| S8 | −1.2806E+00 | 5.3489E−01 | −1.2520E−01 | 1.2584E−02 | 0.0000E+00 |
| S9 | 2.7898E−03 | −3.4541E−04 | 2.3855E−05 | −7.0353E−07 | 0.0000E+00 |
| S10 | 3.3083E−04 | −3.6962E−05 | 2.1914E−06 | −4.4405E−08 | 0.0000E+00 |

Figure 10A:
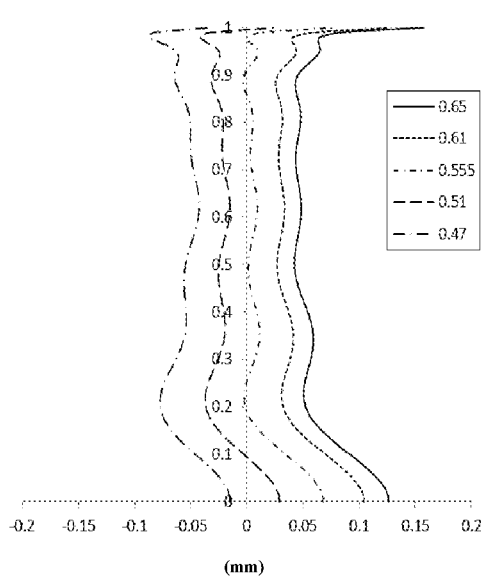
FIGS. 10A to 10D show a longitudinal aberration curve, astigmatism curve, distortion curve and relative illumination curve of the camera lens according to Embodiment 5, respectively.
Figure 10B:
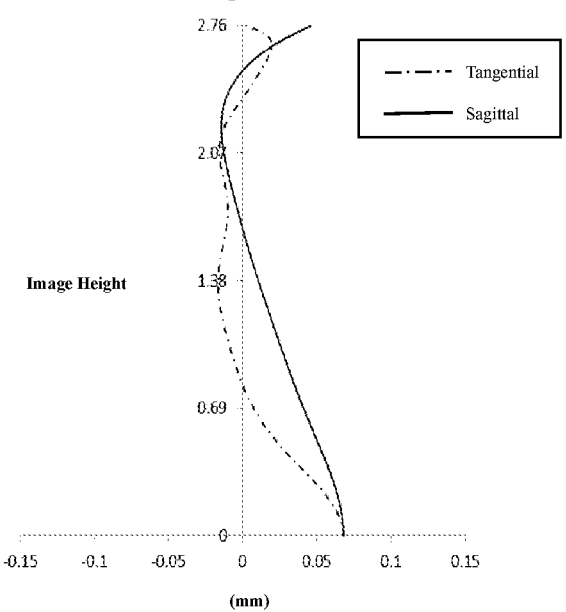
Figure 10C:
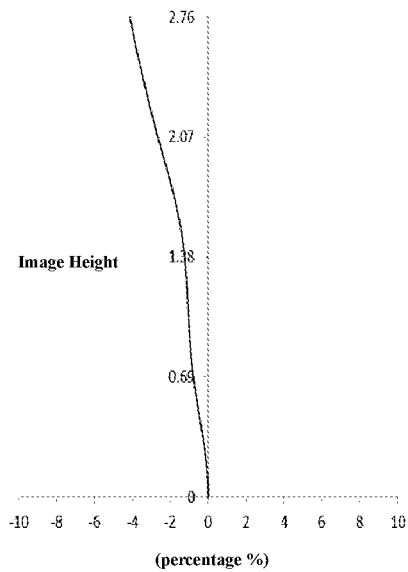
Figure 10D:
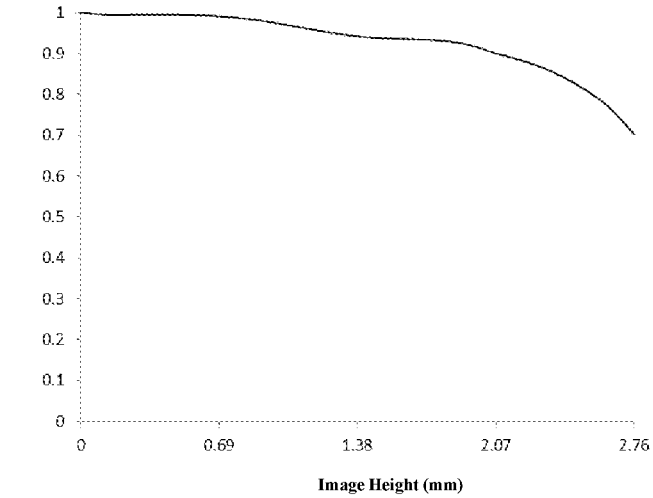

FIG. 10A shows a longitudinal aberration curve of the camera lens according to Embodiment 5, which represents the deviation of the converged focal point after light of different wavelengths passes through the imaging lens. FIG. 10B shows an astigmatism curve of the camera lens according to Embodiment 5, which represents the curvature of the tangential image plane and the curvature of the sagittal image plane. FIG. 10C shows a distortion curve of the camera lens according to Embodiment 5, which represents distortion magnitude values corresponding to different image heights. FIG. 10D shows a relative illumination curve of the camera lens according to Embodiment 5, which represents relative illumination magnitude values corresponding to different image heights. According to FIGS. 10A to 10D, it can be seen that the camera lens given in Embodiment 5 can achieve good imaging quality.

Embodiment 6

Figure 11:
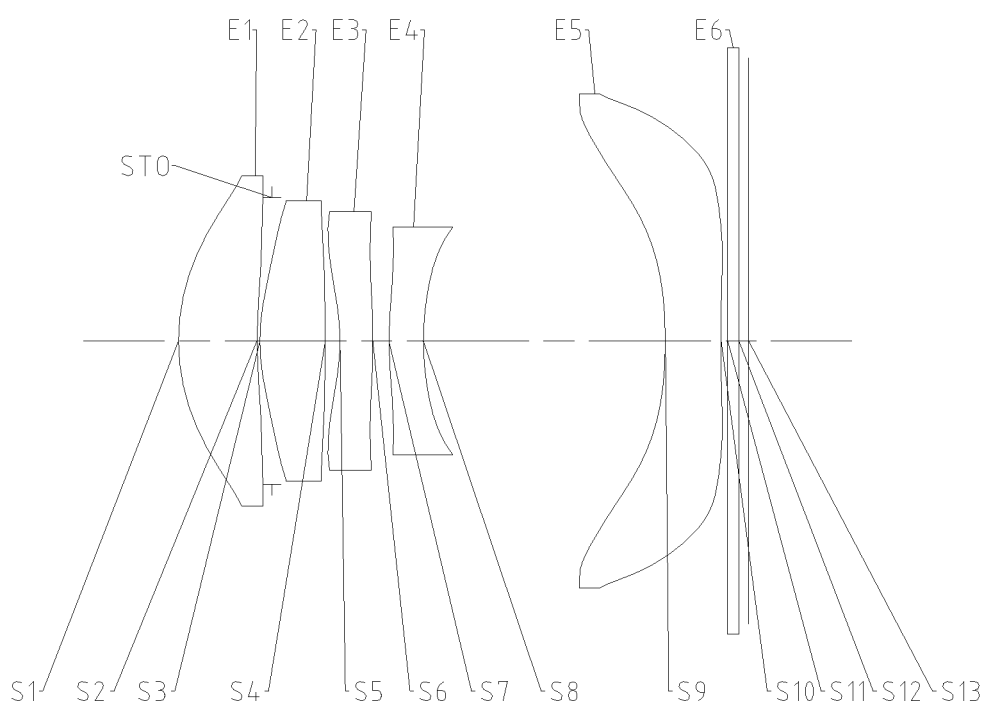
FIG. 11 shows a schematic structural diagram of the camera lens according to Embodiment 6 of the present application.

A camera lens according to Embodiment 6 of the present application will be described below with reference to FIGS. 11 to 12D. FIG. 11 shows a schematic structural diagram of the camera lens according to Embodiment 6 of the present application.

As shown in FIG. 11, the camera lens includes in order from an object side to an image side: a first lens E1, a diaphragm STO, a second lens E2, a third lens E3, a fourth lens E4, a fifth lens E5, a filter E6 and an imaging plane S13.

The first lens E1 has a positive refractive power, and has a convex object side surface S1 and a concave image side surface S2. The second lens E2 has a positive refractive power, and has a convex object side surface S3 and a convex image side surface S4. The third lens E3 has a negative refractive power, and has a concave object side surface S5 and a convex image side surface S6. The fourth lens E4 has a negative refractive power, and has a convex object side surface S7 and a concave image side surface S8. The fifth lens E5 has a negative refractive power, and has a concave object side surface S9 and a convex image side surface S10. The filter E6 has an object side surface S11 and an image side surface S12. Light from an object sequentially passes through the respective surfaces S1 to S12 and finally forms an image on the imaging plane S13.

In this embodiment, a total effective focal length f of the camera lens is 5.93 mm, a total length TTL of the camera lens is 5.64 mm, and a half of a diagonal length ImgH of an effective pixel region on the imaging plane S13 of the camera lens is 2.76 mm.

Table 11 shows a table of basic parameters of the camera lens of Embodiment 6, wherein the units of the radius of curvature, thickness/distance, and focal length are all millimeters (mm). Tables 12-1 and 12-2 show higher-order coefficients of each of aspheric lens surfaces that are applicable in Embodiment 6, wherein the surface shape of each aspheric surface can be defined by formula (1) given in Embodiment 1 described above.

TABLE 11

| Surface No. | Surface type | Radius of curvature | Thickness/ distance | Material Refractive index | Material Abbe number | Focal length | Conic coefficient |
| --- | --- | --- | --- | --- | --- | --- | --- |
| OBJ | Spherical | Infinity | Infinity | | | | |
| S1 | Aspherical | 2.0982 | 0.7751 | 1.48 | 30.8 | 7.65 | 0.0000 |
| S2 | Aspherical | 4.2534 | 0.1485 | | | | 0.0000 |
| STO | Spherical | Infinity | −0.1185 | | | | |
| S3 | Aspherical | 2.0922 | 0.6469 | 1.52 | 30.4 | 3.71 | 0.0000 |
| S4 | Aspherical | −26.4038 | 0.1447 | | | | 0.0000 |
| S5 | Aspherical | −2.0314 | 0.3243 | 1.71 | 19.0 | −3.71 | 0.0000 |
| S6 | Aspherical | −9.3744 | 0.1588 | | | | 0.0000 |
| S7 | Aspherical | 2.8670 | 0.3415 | 1.68 | 19.1 | −104.98 | 0.0000 |
| S8 | Aspherical | 2.6235 | 2.3933 | | | | 0.0000 |
| S9 | Aspherical | −3.8461 | 0.5504 | 1.45 | 20.7 | −8.50 | 0.0000 |
| S10 | Aspherical | −532.2932 | 0.0653 | | | | 0.0000 |
| S11 | Spherical | Infinity | 0.1100 | 1.52 | 64.2 | | |
| S12 | Spherical | Infinity | 0.0969 | | | | |
| S13 | Spherical | Infinity | | | | | |

TABLE 12-1

| Surface No. | A4 | A6 | A8 | A10 | A12 | A14 |
| --- | --- | --- | --- | --- | --- | --- |
| S1 | 1.1863E−02 | −8.9876E−02 | 3.1553E−01 | −6.7955E−01 | 9.2162E−01 | −8.2306E−01 |
| S2 | −1.2705E−01 | 1.9755E−01 | −5.3833E−01 | 9.7500E−01 | −1.0817E+00 | 7.7402E−01 |
| S3 | −1.1714E−01 | 9.2073E−02 | −2.3050E−01 | 2.1325E−01 | 1.0258E−01 | −3.5760E−01 |
| S4 | −2.2778E−02 | 1.5813E−01 | −6.8913E−01 | 1.4050E+00 | −1.5600E+00 | 1.0249E+00 |
| S5 | 1.5131E−01 | 2.2935E−01 | −9.5740E−01 | 1.8919E+00 | −2.3095E+00 | 1.8290E+00 |
| S6 | −1.5462E−01 | 9.9474E−01 | −3.0270E+00 | 6.5680E+00 | −1.0345E+01 | 1.1389E+01 |
| S7 | −3.8875E−01 | 8.1254E−01 | −1.5660E+00 | 2.5059E+00 | −3.4071E+00 | 3.7775E+00 |
| S8 | −1.3497E−01 | 5.8392E−01 | −2.5582E+00 | 9.3827E+00 | −2.2896E+01 | 3.6235E+01 |
| S9 | 5.0533E−02 | −1.9724E−01 | 2.4164E−01 | −1.7515E−01 | 8.0273E−02 | −2.3487E−02 |
| S10 | 5.1122E−02 | 6.6060E−02 | −3.2322E−01 | 3.7253E−01 | −2.1947E−01 | 7.6556E−02 |

TABLE 12-2

| Surface No. | A16 | A18 | A20 | A22 | A24 |
|---|---|---|---|---|---|
| S1 | 4.9144E−01 | −1.9442E−01 | 4.8926E−02 | −7.0903E−03 | 4.5038E−04 |
| S2 | −3.6238E−01 | 1.0763E−01 | −1.8419E−02 | 1.3826E−03 | 0.0000E+00 |
| S3 | 3.1205E−01 | −1.3831E−01 | 3.1980E−02 | −3.0734E−03 | 0.0000E+00 |
| S4 | −4.0779E−01 | 9.5738E−02 | −1.2062E−02 | 6.1867E−04 | 0.0000E+00 |
| S5 | −9.4638E−01 | 3.1187E−01 | −6.0051E−02 | 5.1922E−03 | 0.0000E+00 |
| S6 | −8.4019E+00 | 3.9351E+00 | −1.0552E+00 | 1.2317E−01 | 0.0000E+00 |
| S7 | −3.0404E+00 | 1.5706E+00 | −4.5247E−01 | 5.3849E−02 | 0.0000E+00 |
| S8 | −3.6691E+01 | 2.2904E+01 | −8.0224E+00 | 1.2060E+00 | 0.0000E+00 |
| S9 | 4.3576E−03 | −4.9489E−04 | 3.1305E−05 | −8.4183E−07 | 0.0000E+00 |
| S10 | −1.6528E−02 | 2.1795E−03 | −1.6147E−04 | 5.1629E−06 | 0.0000E+00 |

FIG. 12A shows a longitudinal aberration curve of the camera lens according to Embodiment 6, which represents the deviation of the converged focal point after light of different wavelengths passes through the imaging lens. FIG. 12B shows an astigmatism curve of the camera lens according to Embodiment 6, which represents the curvature of the tangential image plane and the curvature of the sagittal image plane. FIG. 12C shows a distortion curve of the camera lens according to Embodiment 6, which represents distortion magnitude values corresponding to different image heights. FIG. 12D shows a relative illumination curve of the camera lens according to Embodiment 6, which represents relative illumination magnitude values corresponding to different image heights. According to FIGS. 12A to 12D, it can be seen that the camera lens given in Embodiment 6 can achieve good imaging quality.

Embodiment 7

Figure 13:
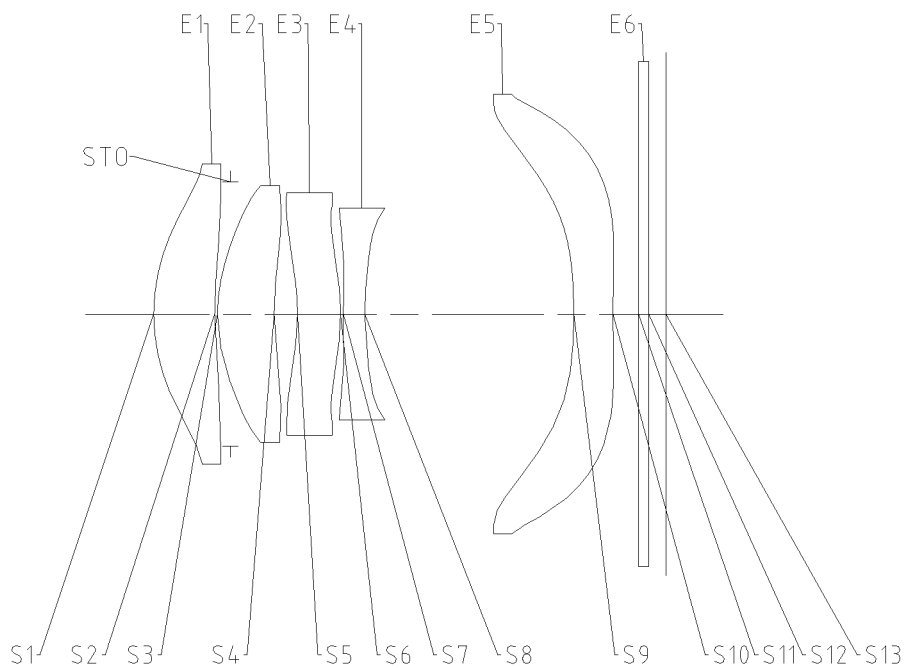
FIG. 13 shows a schematic structural diagram of the camera lens according to Embodiment 7 of the present application.

A camera lens according to Embodiment 7 of the present application will be described below with reference to FIGS. 13 to 14D. FIG. 13 shows a schematic structural diagram of the camera lens according to Embodiment 7 of the present application.

As shown in FIG. 13, the camera lens includes in order from an object side to an image side: a first lens E1, a diaphragm STO, a second lens E2, a third lens E3, a fourth lens E4, a fifth lens E5, a filter E6 and an imaging plane S13.

The first lens E1 has a positive refractive power, and has a convex object side surface S1 and a concave image side surface S2. The second lens E2 has a positive refractive power, and has a convex object side surface S3 and a concave image side surface S4. The third lens E3 has a positive refractive power, and has a concave object side surface S5 and a convex image side surface S6. The fourth lens E4 has a negative refractive power, and has a convex object side surface S7 and a concave image side surface S8. The fifth lens E5 has a negative refractive power, and has a convex object side surface S9 and a concave image side surface S10. The filter E6 has an object side surface S11 and an image side surface S12. Light from an object sequentially passes through the respective surfaces S1 to S12 and finally forms an image on the imaging plane S13.

In this embodiment, a total effective focal length f of the camera lens is 5.80 mm, a total length TTL of the camera lens is 5.51 mm, and a half of a diagonal length ImgH of an effective pixel region on the imaging plane S13 of the camera lens is 2.76 mm.

Table 13 shows a table of basic parameters of the camera lens of Embodiment 7, wherein the units of the radius of curvature, thickness/distance, and focal length are all millimeters (mm). Tables 14-1 and 14-2 show higher-order coefficients of each of aspheric lens surfaces that are applicable in Embodiment 7, wherein the surface shape of each aspheric surface can be defined by formula (1) given in Embodiment 1 described above.

TABLE 13

| | | | | Material | | | |
|---|---|---|---|---|---|---|---|
| Surface No. | Surface type | Radius of curvature | Thickness/ distance | Refractive index | Abbe number | Focal length | Conic coefficient |
| OBJ | Spherical | Infinity | Infinity | | | | |
| S1 | Aspherical | 2.0968 | 0.6555 | 1.45 | 31.2 | 8.38 | 0.0000 |
| S2 | Aspherical | 4.2665 | 0.1680 | | | | 0.0000 |
| STO | Spherical | Infinity | −0.1379 | | | | |
| S3 | Aspherical | 1.7183 | 0.6107 | 1.50 | 30.7 | 5.77 | 0.0000 |
| S4 | Aspherical | 3.7531 | 0.2519 | | | | 0.0000 |
| S5 | Aspherical | −2.5108 | 0.4630 | 1.71 | 19.0 | 599.72 | 0.0000 |
| S6 | Aspherical | −2.6876 | 0.0300 | | | | 0.0000 |
| S7 | Aspherical | 6.1828 | 0.2300 | 1.70 | 19.0 | −8.48 | 0.0000 |
| S8 | Aspherical | 2.9960 | 2.2511 | | | | 0.0000 |
| S9 | Aspherical | −6.2247 | 0.4213 | 1.62 | 24.6 | −5.85 | 0.0000 |
| S10 | Aspherical | 9.2328 | 0.2747 | | | | 0.0000 |
| S11 | Spherical | Infinity | 0.1100 | 1.52 | 64.2 | | |
| S12 | Spherical | Infinity | 0.1841 | | | | |
| S13 | Spherical | Infinity | | | | | |

TABLE 14-1

| Surface No. | A4 | A6 | A8 | A10 | A12 | A14 |
|---|---|---|---|---|---|---|
| S1 | 1.5841E−02 | −1.1955E−01 | 4.2551E−01 | −9.6424E−01 | 1.3875E+00 | −1.3087E+00 |
| S2 | −1.2992E−01 | 1.4215E−01 | −1.4975E−01 | 2.0352E−01 | −2.8902E−01 | 2.7396E−01 |
| S3 | −1.1669E−01 | 2.0431E−02 | 1.7265E−01 | −4.1447E−01 | 5.3109E−01 | −4.9913E−01 |
| S4 | −4.3744E−02 | 5.3335E−02 | −8.6596E−01 | 3.5243E+00 | −7.4965E+00 | 9.3934E+00 |
| S5 | 1.4750E−01 | −3.3476E−01 | 1.2366E+00 | −2.6247E+00 | 3.2954E+00 | −2.5124E+00 |
| S6 | −2.1275E−01 | 2.4080E−01 | 1.0377E+00 | −6.1218E+00 | 1.4461E+01 | −2.0170E+01 |
| S7 | −3.5706E−01 | 8.6945E−02 | 3.6393E+00 | −1.5742E+01 | 3.4750E+01 | −4.7093E+01 |
| S8 | −2.3104E−01 | 2.2868E−01 | 3.1540E−01 | −7.7205E−01 | −7.0355E−01 | 4.5027E+00 |
| S9 | −3.3662E−02 | −6.8033E−02 | 9.8084E−02 | −7.5623E−02 | 3.8010E−02 | −1.2621E−02 |
| S10 | −1.0750E−01 | 1.1582E−01 | −1.3440E−01 | 1.0098E−01 | −4.9802E−02 | 1.6369E−02 |

TABLE 14-2

| Surface No. | A16 | A18 | A20 | A22 | A24 |
|---|---|---|---|---|---|
| S1 | 8.1557E−01 | −3.3236E−01 | 8.5126E−02 | −1.2428E−02 | 7.8846E−04 |
| S2 | −1.5587E−01 | 5.1788E−02 | −9.3024E−03 | 6.9927E−04 | 0.0000E+00 |
| S3 | 3.5127E−01 | −1.6237E−01 | 4.1848E−02 | −4.4856E−03 | 0.0000E+00 |
| S4 | −7.1602E+00 | 3.2657E+00 | −8.2019E−01 | 8.7366E−02 | 0.0000E+00 |
| S5 | 1.1433E+00 | −2.8862E−01 | 3.3159E−02 | −7.4970E−04 | 0.0000E+00 |
| S6 | 1.7834E+01 | −9.8670E+00 | 3.1289E+00 | −4.3444E−01 | 0.0000E+00 |
| S7 | 4.0745E+01 | −2.2033E+01 | 6.8071E+00 | −9.1934E−01 | 0.0000E+00 |
| S8 | −6.9373E+00 | 5.3041E+00 | −2.0760E+00 | 3.3206E−01 | 0.0000E+00 |
| S9 | 2.7239E−03 | −3.6598E−04 | 2.7758E−05 | −9.0734E−07 | 0.0000E+00 |
| S10 | −3.5631E−03 | 4.9448E−04 | −3.9729E−05 | 1.4103E−06 | 0.0000E+00 |

Figure 14A:
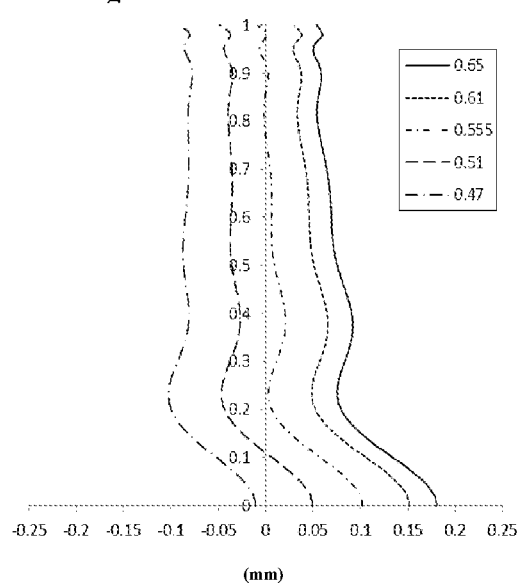
Figure 14B:
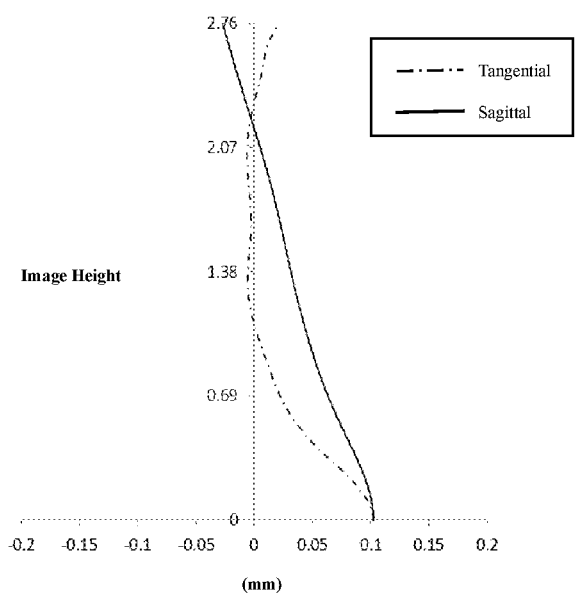

FIG. 14A shows a longitudinal aberration curve of the camera lens according to Embodiment 7, which represents the deviation of the converged focal point after light of different wavelengths passes through the imaging lens. FIG. 14B shows an astigmatism curve of the camera lens according to Embodiment 7, which represents the curvature of the tangential image plane and the curvature of the sagittal image plane. FIG. 14C shows a distortion curve of the camera lens according to Embodiment 7, which represents distortion magnitude values corresponding to different image heights. FIG. 14D shows a relative illumination curve of the camera lens according to Embodiment 7, which represents relative illumination magnitude values corresponding to different image heights. According to FIGS. 14A to 14D, it can be seen that the camera lens given in Embodiment 7 can achieve good imaging quality.

Embodiment 8

A camera lens according to Embodiment 8 of the present application will be described below with reference to FIGS. 15 to 16D. FIG. 15 shows a schematic structural diagram of the camera lens according to Embodiment 8 of the present application.

As shown in FIG. 15, the camera lens includes in order from an object side to an image side: a diaphragm STO, a first lens E1, a second lens E2, a third lens E3, a fourth lens E4, a fifth lens E5, a filter E6 and an imaging plane S13.

The first lens E1 has a positive refractive power, and has a convex object side surface S1 and a concave image side surface S2. The second lens E2 has a positive refractive power, and has a convex object side surface S3 and a convex image side surface S4. The third lens E3 has a negative refractive power, and has a concave object side surface S5 and a concave image side surface S6. The fourth lens E4 has a positive refractive power, and has a convex object side surface S7 and a concave image side surface S8. The fifth lens E5 has a negative refractive power, and has a concave object side surface S9 and a concave image side surface S10. The filter E6 has an object side surface S11 and an image side surface S12. Light from an object sequentially passes through the respective surfaces S1 to S12 and finally forms an image on the imaging plane S13.

In this embodiment, a total effective focal length f of the camera lens is 5.98 mm, a total length TTL of the camera lens is 5.68 mm, and a half of a diagonal length ImgH of an effective pixel region on the imaging plane S13 of the camera lens is 2.76 mm.

Table 15 shows a table of basic parameters of the camera lens of Embodiment 8, wherein the units of the radius of curvature, thickness/distance, and focal length are all millimeters (mm). Tables 16-1 and 16-2 show higher-order coefficients of each of aspheric lens surfaces that are applicable in Embodiment 8, wherein the surface shape of each aspheric surface can be defined by formula (1) given in Embodiment 1 described above.

TABLE 15

| | | | | Material | | | |
|---|---|---|---|---|---|---|---|
| Surface No. | Surface type | Radius of curvature | Thickness/ distance | Refractive index | Abbe number | Focal length | Conic coefficient |
| OBJ | Spherical | Infinity | Infinity | | | | |
| STO | Spherical | Infinity | −0.6212 | | | | |
| S1 | Aspherical | 1.9930 | 0.7394 | 1.55 | 56.1 | 6.55 | 0.0000 |

TABLE 15-continued

| Surface No. | Surface type | Radius of curvature | Thickness/ distance | Material Refractive index | Abbe number | Focal length | Conic coefficient |
|---|---|---|---|---|---|---|---|
| S2 | Aspherical | 3.9151 | 0.0412 | | | | 0.0000 |
| S3 | Aspherical | 1.9559 | 0.5126 | 1.55 | 56.1 | 3.58 | 0.0000 |
| S4 | Aspherical | −1072.5071 | 0.1499 | | | | 0.0000 |
| S5 | Aspherical | −2.1490 | 0.2811 | 1.68 | 19.2 | −1.73 | 0.0000 |
| S6 | Aspherical | 2.7090 | 0.1672 | | | | 0.0000 |
| S7 | Aspherical | 1.6232 | 0.2643 | 1.68 | 19.2 | 3.71 | 0.0000 |
| S8 | Aspherical | 4.2739 | 1.9460 | | | | 0.0000 |
| S9 | Aspherical | −5.1330 | 0.9235 | 1.54 | 55.7 | −7.25 | 0.0000 |
| S10 | Aspherical | 17.0779 | 0.3303 | | | | 0.0000 |
| S11 | Spherical | Infinity | 0.1100 | 1.52 | 64.2 | | |
| S12 | Spherical | Infinity | 0.2134 | | | | |
| S13 | Spherical | Infinity | | | | | |

TABLE 16-1

| Surface No. | A4 | A6 | A8 | A10 | A12 | A14 |
|---|---|---|---|---|---|---|
| S1 | 8.9039E−03 | −7.7932E−02 | 3.1476E−01 | −7.8221E−01 | 1.2408E+00 | −1.3003E+00 |
| S2 | −4.9472E−02 | −3.5101E−01 | 1.1950E+00 | −2.0725E+00 | 2.3020E+00 | −1.7099E+00 |
| S3 | −3.1414E−02 | −5.0618E−01 | 1.5173E+00 | −2.6961E+00 | 3.2228E+00 | −2.6392E+00 |
| S4 | 8.1407E−02 | −3.1477E−01 | 5.8620E−01 | −6.3732E−01 | 3.3207E−01 | 6.5781E−02 |
| S5 | 2.0804E−01 | 5.6438E−02 | −4.5635E−01 | 8.8884E−01 | −1.1316E+00 | 1.0594E+00 |
| S6 | −3.1362E−01 | 1.6392E+00 | −5.1716E+00 | 1.2509E+01 | −2.3007E+01 | 3.0485E+01 |
| S7 | −4.2709E−01 | 7.3082E−01 | −1.2129E+00 | 1.9606E+00 | −3.7446E+00 | 6.2653E+00 |
| S8 | −2.9136E−02 | 8.0071E−03 | −5.7303E−02 | 1.2640E+00 | −4.9163E+00 | 9.5402E+00 |
| S9 | 3.3897E−02 | −2.0252E−01 | 3.2539E−01 | −3.0971E−01 | 1.8867E−01 | −7.5432E−02 |
| S10 | −7.8056E−02 | 1.0329E−01 | −1.5157E−01 | 1.2885E−01 | −6.7108E−02 | 2.2148E−02 |

TABLE 16-2

| Surface No. | A16 | A18 | A20 | A22 | A24 |
|---|---|---|---|---|---|
| S1 | 9.1095E−01 | −4.2242E−01 | 1.2443E−01 | −2.1087E−02 | 1.5651E−03 |
| S2 | 8.4313E−01 | −2.6430E−01 | 4.7584E−02 | −3.7398E−03 | 0.0000E+00 |
| S3 | 1.4522E+00 | −5.0983E−01 | 1.0257E−01 | −8.9572E−03 | 0.0000E+00 |
| S4 | −2.0484E−01 | 1.2163E−01 | −3.2553E−02 | 3.4303E−03 | 0.0000E+00 |
| S5 | −7.0372E−01 | 3.0426E−01 | −7.5617E−02 | 8.1700E−03 | 0.0000E+00 |
| S6 | −2.7571E+01 | 1.5970E+01 | −5.3092E+00 | 7.6827E−01 | 0.0000E+00 |
| S7 | −7.1117E+00 | 4.9198E+00 | −1.8647E+00 | 2.9652E−01 | 0.0000E+00 |
| S8 | −1.0726E+01 | 7.1072E+00 | −2.5778E+00 | 3.9472E−01 | 0.0000E+00 |
| S9 | 1.9729E−02 | −3.2537E−03 | 3.0716E−04 | −1.2654E−05 | 0.0000E+00 |
| S10 | −4.6519E−03 | 6.0211E−04 | −4.3712E−05 | 1.3569E−06 | 0.0000E+00 |

Figure 16A:
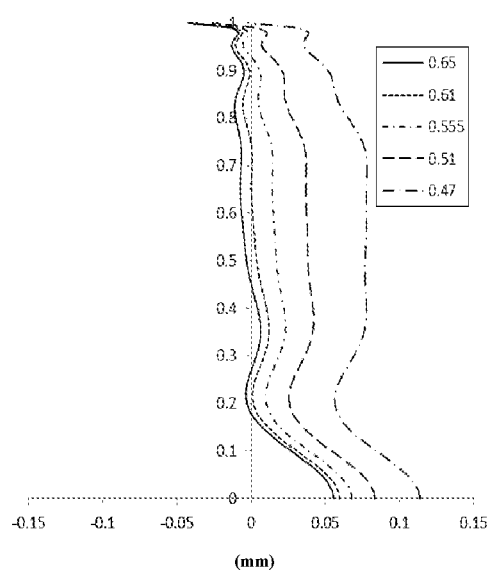
FIGS. 16A to 16D show a longitudinal aberration curve, astigmatism curve, distortion curve and relative illumination curve of the camera lens according to Embodiment 8, respectively.
Figure 16B:
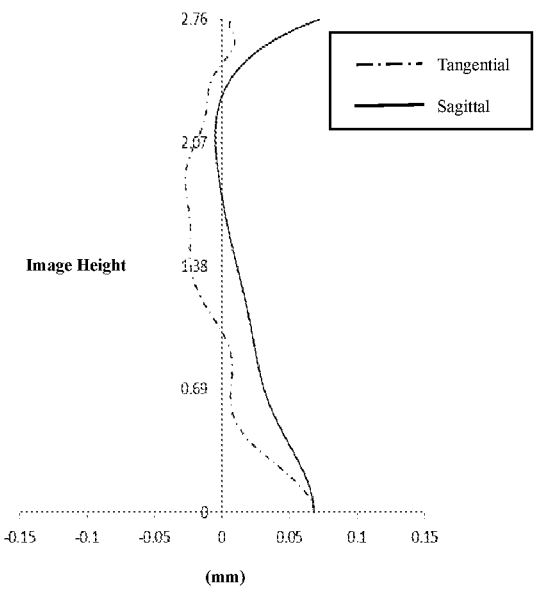
Figure 16C:
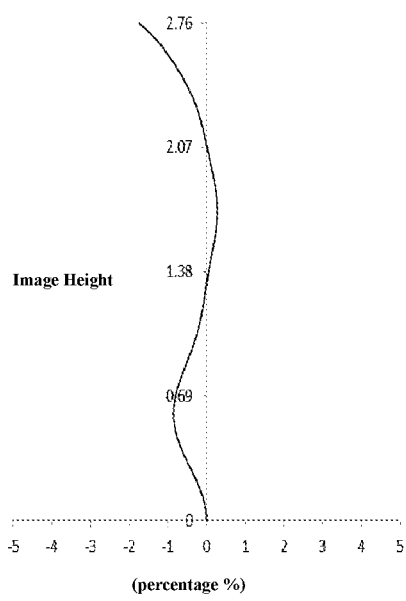
Figure 16D:
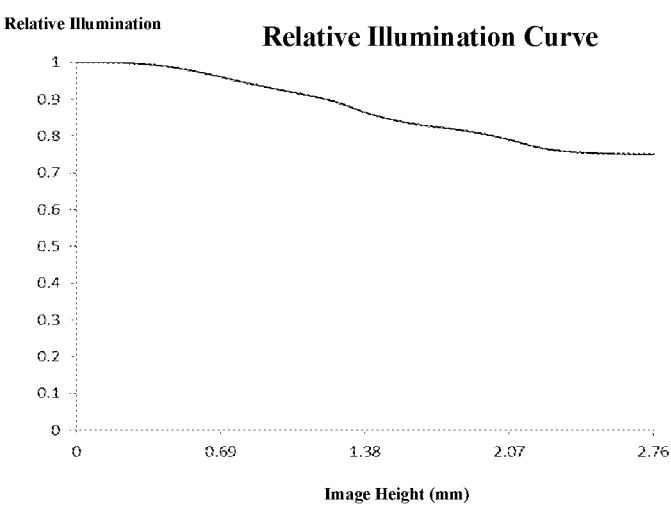

FIG. 16A shows a longitudinal aberration curve of the camera lens according to Embodiment 8, which represents the deviation of the converged focal point after light of different wavelengths passes through the imaging lens. FIG. 16B shows an astigmatism curve of the camera lens according to Embodiment 8, which represents the curvature of the tangential image plane and the curvature of the sagittal image plane. FIG. 16C shows a distortion curve of the camera lens according to Embodiment 8, which represents distortion magnitude values corresponding to different image heights. FIG. 16D shows a relative illumination curve of the camera lens according to Embodiment 8, which represents relative illumination magnitude values corresponding to different image heights. According to FIGS. 16A to 16D, it can be seen that the camera lens given in Embodiment 8 can achieve good imaging quality.

In summary, Embodiments 1 to 8 satisfy the relationships shown in Table 17, respectively.

TABLE 17

| Conditional expression | Embodiment | | | | | | | |
| | 1 | 2 | 3 | 4 | 5 | 6 | 7 | 8 |
|---|---|---|---|---|---|---|---|---|
| f2/f1 | 0.55 | 0.52 | 0.49 | 0.48 | 0.46 | 0.48 | 0.69 | 0.55 |
| TTL/EPD | 1.80 | 1.88 | 1.88 | 1.86 | 1.88 | 1.88 | 1.88 | 1.88 |
| CT4/TD | 0.04 | 0.05 | 0.05 | 0.05 | 0.08 | 0.06 | 0.05 | 0.05 |

TABLE 17-continued

| Conditional expression | Embodiment | | | | | | | |
|---|---|---|---|---|---|---|---|---|
| | 1 | 2 | 3 | 4 | 5 | 6 | 7 | 8 |
| T45/TD | 0.44 | 0.43 | 0.43 | 0.42 | 0.42 | 0.45 | 0.46 | 0.39 |
| 10 × \|(R1 − R3)/(R1 + R3)\| | 0.35 | 0.22 | 0.21 | 0.51 | 0.00 | 0.01 | 0.99 | 0.09 |
| 10 × (R1/f − R1/f1) | 0.11 | 0.41 | 0.42 | 0.78 | 0.34 | 0.79 | 1.11 | 0.29 |
| f1234/f | 0.89 | 0.94 | 0.91 | 0.88 | 0.89 | 0.92 | 0.88 | 0.86 |
| CT3/ET3 | 0.52 | 0.40 | 0.41 | 0.29 | 0.35 | 0.79 | 0.95 | 0.48 |
| ET5/CT5 | 0.58 | 0.32 | 0.27 | 0.45 | 0.31 | 0.35 | 0.46 | 0.25 |
| SAG52/CT5 | −1.61 | −2.03 | −1.84 | −1.97 | −1.79 | −2.19 | −2.59 | −1.57 |
| DT32/DT41 | 1.01 | 1.01 | 1.02 | 1.02 | 1.01 | 1.06 | 1.02 | 1.01 |
| DT41/ImgH | 0.39 | 0.42 | 0.41 | 0.43 | 0.43 | 0.41 | 0.41 | 0.41 |
| YC31/DT31 | 0.70 | 0.78 | 0.83 | 0.68 | 0.86 | 0.85 | 0.93 | 0.71 |
| 10 × (T12 + T23 + T34)/TTL | 0.51 | 0.63 | 0.67 | 0.68 | 0.65 | 0.59 | 0.57 | 0.63 |

The present application further provides an imaging apparatus, of which an electronic photosensitive element may be a Charge-coupled Device (CCD) or a complementary metal oxide semiconductor element (CMOS). The imaging apparatus may be an independent imaging apparatus such as a digital camera, or may be an imaging module integrated in a mobile electronic device such as a mobile phone. The imaging apparatus is equipped with the camera lens described above.

The above description is only the preferred embodiments of the present application and the explanation of the applied technical principle. It should be understood by those skilled in the art that the scope of disclosure involved in the present application is not limited to technical solutions formed by specific combinations of the above technical features, and at the same time, should also cover other technical solutions formed by any combination of the above technical features or equivalent features thereof without departing from the concept of the disclosure. For example, the above features and (but not limited to) the technical features with similar functions disclosed in the present application are replaced with each other to form technical solutions.

What is claimed is:

1. A camera lens, comprising, in order from an object side to an image side along an optical axis:
 a first lens having a positive refractive power;
 a second lens having a positive refractive power, an object side surface thereof being convex;
 a third lens having a refractive power;
 a fourth lens having a refractive power, an object side surface thereof being convex; and
 a fifth lens having a refractive power,
 wherein an effective focal length f2 of the second lens and an effective focal length f1 of the first lens satisfy: 0.3<f2/f1<0.7; and
 a distance TTL from an object side surface of the first lens to an imaging plane of the camera lens on the optical axis and an entrance pupil diameter EPD of the camera lens satisfy: TTL/EPD<2.5.

2. The camera lens according to claim 1, wherein a separation distance T45 between the fourth lens and the fifth lens on the optical axis and a distance TD from the object side surface of the first lens to an image side surface of the fifth lens on the optical axis satisfy: T45/TD>0.38.

3. The camera lens according to claim 1, wherein a radius of curvature R1 of the object side surface of the first lens, a total effective focal length f of the camera lens, and an effective focal length f1 of the first lens satisfy: 10×(R1/f−R1/f1)<1.2.

4. The camera lens according to claim 1, wherein a combined focal length f1234 of the first lens, the second lens, the third lens, and the fourth lens, and a total effective focal length f of the camera lens satisfy: 0.7<f1234/f<1.

5. The camera lens according to claim 1, wherein a center thickness CT3 of the third lens and an edge thickness ET3 of the third lens satisfy: 0.2<CT3/ET3<1.

6. The camera lens according to claim 1, wherein a distance SAG52 from an intersection of an image side surface of the fifth lens and the optical axis to an effective radius vertex of the image side surface of the fifth lens on the optical axis, and a center thickness CT5 of the fifth lens satisfy: −2.6<SAG52/CT5<−1.

7. The camera lens according to claim 1, wherein an effective half diameter DT32 of an image side surface of the third lens and an effective half diameter DT41 of the object side surface of the fourth lens satisfy: 1<DT32/DT41<1.2.

8. The camera lens according to claim 1, wherein an effective half diameter DT41 of the object side surface of the fourth lens and a half of a diagonal length ImgH of an effective pixel region of the camera lens satisfy: 0.3<DT41/ImgH<0.5.

9. The camera lens according to claim 1, wherein a separation distance T12 between the first lens and the second lens on the optical axis, a separation distance T23 between the second lens and the third lens on the optical axis, and a separation distance T34 between the third lens and the fourth lens on the optical axis satisfy: 10×(T12+T23+T34)/TTL<1.

* * * * *